United States Patent
Hsu et al.

(10) Patent No.: US 10,429,611 B2
(45) Date of Patent: Oct. 1, 2019

(54) OPTICAL PHOTOGRAPHING LENS ASSEMBLY, IMAGING APPARATUS AND ELECTRONIC DEVICE

(71) Applicant: LARGAN PRECISION CO., LTD., Taichung (TW)

(72) Inventors: Po-Lun Hsu, Taichung (TW); Chun-Yen Chen, Taichung (TW); Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/865,503

(22) Filed: Jan. 9, 2018

(65) Prior Publication Data
US 2019/0094494 A1 Mar. 28, 2019

(30) Foreign Application Priority Data
Sep. 25, 2017 (TW) .............................. 106132833 A

(51) Int. Cl.
*G02B 9/64* (2006.01)
*G02B 27/00* (2006.01)

(52) U.S. Cl.
CPC ........... *G02B 9/64* (2013.01); *G02B 27/0025* (2013.01)

(58) Field of Classification Search
CPC .............................. G02B 9/64; G02B 27/0025
USPC ................................................... 359/708, 754
See application file for complete search history.

(56) References Cited

U.S. PATENT DOCUMENTS

| | | | |
|---|---|---|---|
| 2015/0198787 A1 | 7/2015 | Kubota et al. | |
| 2015/0247990 A1 | 9/2015 | Kubota et al. | |
| 2016/0170180 A1 | 6/2016 | Son | |
| 2017/0329109 A1* | 11/2017 | Kubota | G02B 13/0045 |
| 2019/0056569 A1 | 2/2019 | Yoo et al. | |

FOREIGN PATENT DOCUMENTS

| | | |
|---|---|---|
| CN | 106896477 A | 6/2017 |
| CN | 107422465 A | 12/2017 |

* cited by examiner

*Primary Examiner* — James R Greece
(74) *Attorney, Agent, or Firm* — McClure, Qualey & Rodack, LLP

(57) ABSTRACT

An optical photographing lens assembly includes seven lens elements, which are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The third lens element has positive refractive power. The seventh lens element has an image-side surface being concave in a paraxial region thereof and including at least one convex shape in an off-axis region thereof. An object-side surface and the image-side surface of the seventh lens element are aspheric.

26 Claims, 29 Drawing Sheets

OPTICAL PHOTOGRAPHING LENS ASSEMBLY, IMAGING APPARATUS AND ELECTRONIC DEVICE

RELATED APPLICATIONS

This application claims priority to Taiwan Application Serial Number 106132833, filed Sep. 25, 2017, which is herein incorporated by reference.

BACKGROUND

Technical Field

The present disclosure relates to an optical photographing lens assembly and an imaging apparatus. More particularly, the present disclosure relates to an optical photographing lens assembly and an imaging apparatus with enhanced imaging in the off-axis region, a large aperture, and compactness while being applicable to electronic devices.

Description of Related Art

With the expanding functionality of photographing modules, the application of the photographing modules in various intelligent electronic products, entertainment devices, fitness devices and smart home systems is an upward trend of the future technology development. However, with the advance of science and technology, as well as the improved functionality of the electronic products, such as smartphones, the consumer demand for camera functions is also increasing (such as night photography, photographs of fast motion or depth of focus). It is known that conventional optical lens modules have difficulty satisfying the demands of a large aperture and short total track length simultaneously. Particularly, the result of photographing the off-axis region of an image is highly dictated by the aperture size. Therefore, it is the goal for manufacturers in the industry to enhance the image quality in the off-axis region.

SUMMARY

According to one aspect of the present disclosure, an optical photographing lens assembly includes seven lens elements, which are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The third lens element has positive refractive power. The seventh lens element has an image-side surface being concave in a paraxial region thereof and including at least one convex shape in an off-axis region thereof, and an object-side surface and the image-side surface of the seventh lens element are aspheric. When a focal length of the first lens element is f1 a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the optical photographing lens assembly is f, a curvature radius of the object-side surface of the seventh lens element is R13, an axial distance between the third lens element and the fourth lens element is T34, and an axial distance between the fourth lens element and the fifth lens element is T45, the following conditions are satisfied:

$|f3/f1| \le 1.0$;

$|f3/f2| \le 1.0$;

$|f3/f4| \le 1.0$;

$|f3/f5| \le 1.0$;

$|f3/f6| \le 1.0$;

$|f3/f7| \le 1.0$;

$|0.20 \le f/R13$; and $T34/T45 \le 8.0$.

According to another aspect of the present disclosure, an imaging apparatus includes the optical photographing lens assembly according to the aforementioned aspect and an image sensor, wherein the image sensor is disposed on an image surface of the optical photographing lens assembly.

According to further another aspect of the present disclosure, an electronic device includes the imaging apparatus according to the aforementioned aspect.

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1:
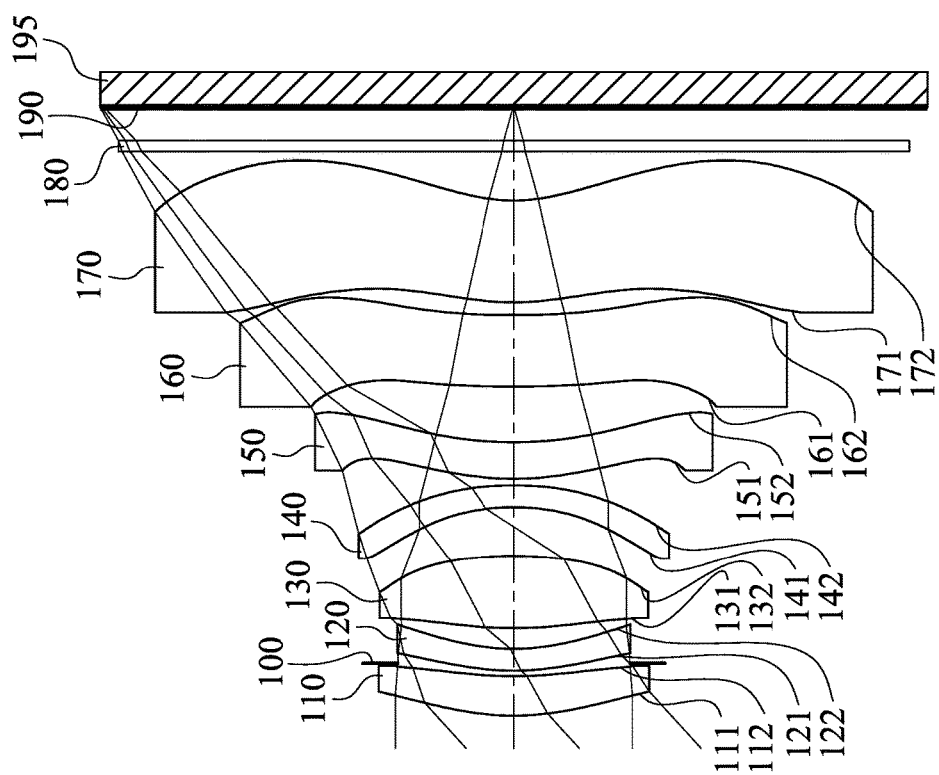
FIG. 1 is a schematic view of an imaging apparatus according to the 1st embodiment of the present disclosure.

An optical photographing lens assembly includes seven lens elements, which are, in order from an object side to an image side, a first lens element, a second lens element, a third lens element, a fourth lens element, a fifth lens element, a sixth lens element and a seventh lens element.

The first lens element with positive refractive power has an object-side surface being convex in a paraxial region thereof. Therefore, it is favorable for the light converging at the object side of the optical photographing lens assembly and for shortening the total track length thereof so as to obtain a compact size. The first lens element can have an image-side surface being concave in a paraxial region thereof, which is favorable for correcting astigmatism.

The third lens element has positive refractive power. Therefore, the distribution of the positive refractive power of the optical photographing lens assembly can be balanced, and the photosensitivity and spherical aberration thereof can be reduced.

The fourth lens element can have negative refractive power, which is favorable for correcting aberrations. The fourth lens element can have an image-side surface being concave in a paraxial region thereof and including at least one convex shape in an off-axis region thereof, which is favorable for correcting aberrations of the off-axis field.

The sixth lens element can have positive refractive power, which is favorable for enhancing the light converging ability of the optical photographing lens assembly. The sixth lens element can have an object-side surface being convex in a paraxial region thereof and including at least one concave shape in an off-axis region thereof, and the sixth lens element can have an image-side surface being concave in a paraxial region thereof and including at least one convex shape in an off-axis region thereof. Therefore, it is favorable for correcting aberrations of the off-axis field.

The seventh lens element has an image-side surface being concave in a paraxial region thereof and including at least one convex shape in an off-axis region thereof. Therefore, it is favorable for correcting aberrations of the off-axis field. Moreover, the object-side surface of the seventh lens element can include at least two critical points (the total number of the critical points is counted between the optical axis to the maximum effective diameter position, which excludes the axial vertex on the optical axis and other critical points in a point symmetrical range thereof). Therefore, off-axis aberrations can be further corrected, and the ability of the optical photographing lens assembly for correcting aberrations in the off-axis region can be enhanced. Accordingly, the image quality in the off-axis region can be enhanced.

When a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and a focal length of the seventh lens element is f7, the following conditions are satisfied: $|f3/f1| \leq 1.0$; $|f3/f2| \leq 1.0$; $|f3/f4| \leq 1.0$; $|f3/f5| \leq 1.0$; $|f3/f6| \leq 1.0$; and $|f3/f7| \leq 1.0$. Therefore, the third lens element is a positive lens element with stronger refractive power, whereby the configuration of the lens element providing the majority of positive refractive power in the optical photographing lens assembly can be shifted toward an image surface. Accordingly, the field of view can be enlarged, and the manufacturing sensitivity of the optical photographing lens assembly can be reduced so as to enhance the manufacturability. Preferably, the following conditions can be satisfied: $|f3/f1| < 0.75$; and $|f3/f6| < 0.60$.

When a focal length of the optical photographing lens assembly is f, and a curvature radius of the object-side surface of the seventh lens element is R13, the following condition is satisfied: $0.20 \leq f/R13$. Therefore, the seventh lens element can be configured with a distinct meniscus shape, which is favorable for correcting aberrations while avoiding excessive or insufficient aberration corrections. Preferably, the following condition can be satisfied: $0.70 < f/R13 < 5.0$. More preferably, the following condition can be satisfied: $1.0 < f/R13 < 4.0$.

When an axial distance between the third lens element and the fourth lens element is T34, and an axial distance between the fourth lens element and the fifth lens element is T45, the following condition can be satisfied: $T34/T45 \leq 8.0$. Therefore, the axial distances between adjacent lens elements of the third lens element, the fourth lens element and the fifth lens element can be balanced, and excessive curvatures of the lens elements due to the excessive axial distances therebetween can be prevented. Preferably, the following condition can be satisfied: $0.50 < T34/T45 < 6.0$.

When a maximum of refractive indexes of all the lens elements of the optical photographing lens assembly is Nmax, the following condition can be satisfied: $1.650 \leq Nmax < 1.75$. Therefore, materials of the lens elements are proper, which is favorable for the compactness of the optical photographing lens assembly. Accordingly, the optical photographing lens assembly is more applicable to compact electronic devices.

The optical photographing lens assembly can include two adjacent lens elements having Abbe numbers less than 30. Therefore, it is favorable for eliminating chromatic aberration.

When the focal length of the optical photographing lens assembly is f, and the focal length of the third lens element is f3, the following condition can be satisfied: f/f3<1.0. Therefore, single lens refractive power of the lens element of the optical photographing lens assembly can be controlled, and problems, such as overcorrection or insufficient correction of the image, due to excessive differences of refractive power among the lens elements can be avoided.

When the focal length of the first lens element is f1, the focal length of the second lens element is f2, the focal length of the fourth lens element is f4, the focal length of the fifth lens element is f5, the focal length of the sixth lens element is f6, and the focal length of the seventh lens element is f7, the following conditions can be satisfied: |f7/f1|≤1.0; |f7/f2|≤1.0; |f7/f4|≤1.0; |f7/f5|≤1.0; and |f7/f6|≤1.0. Therefore, the refractive power of the seventh lens element can be enhanced, and the principal point of the optical photographing lens assembly can be shifted toward the object side, which can ensure a proper angle of light converging on the image surface.

When an axial distance between the object-side surface of the first lens element and the image surface is TL, and a maximum image height of the optical photographing lens assembly is ImgH, the following condition can be satisfied: 0.80<TL/ImgH<1.60. Therefore, the feature of compactness of the optical photographing lens assembly can be enhanced. Preferably, the following condition can be satisfied: 1.0<TL/ImgH<1.60.

When an f-number of the optical photographing lens assembly is Fno, the following condition can be satisfied: 1.0<Fno<2.0. Therefore, the optical photographing lens assembly can be featured with a large aperture, and the photographing functionality in depth of field can be improved.

When a maximum field of view of the optical photographing lens assembly is FOV, the following condition can be satisfied: 70 degrees<FOV<100 degrees. Therefore, it is favorable for balancing the features of wide field of view and the telecentric effect.

When a displacement in parallel with the optical axis from an axial vertex on the image-side surface of the seventh lens element to a maximum effective radius position on the image-side surface of the seventh lens element is Sag72, and a central thickness of the seventh lens element is CT7, the following condition can be satisfied: 1.0<|Sag72|/CT7. Therefore, the effective radius of the seventh lens element can be reduced, which is favorable for reducing the physical sizes of the optical photographing lens assembly and the imaging apparatus. Furthermore, the configuration of the lens elements closer to the image surface, such as the fifth lens element through the seventh lens element, is proper for increasing the degree of freedom in designing the lens structure of the optical photographing lens assembly.

When a total number of lens elements having Abbe numbers less than 30 is V30, the following condition can be satisfied: 3≤V30. Therefore, it is favorable for eliminating chromatic aberration while maintaining high image quality with a large aperture configuration.

When a vertical distance between a non-axial critical point on the object-side surface of the sixth lens element and the optical axis is Yc61, and a vertical distance between a non-axial critical point on the image-side surface of the sixth lens element and the optical axis is Yc62, the following condition can be satisfied: 0.3<Yc61/Yc62<1.5. Therefore, it is favorable for correcting aberrations, enhancing the relative illuminance, and improving the image quality in the off-axis region.

When a total number of lens elements having Abbe numbers less than 20 is V20, the following condition can be satisfied: 1 V20. Therefore, it is favorable for eliminating chromatic aberration and maintaining high image quality with a large aperture configuration.

When a curvature radius of an object-side surface of the fourth lens element is R7, and a curvature radius of the image-side surface of the fourth lens element is R8, the following condition can be satisfied: 0≤R8/|R7|<1.0. Therefore, excessive curvature of the fourth lens element can be prevented so as to enhance the manufacturability and prevent the generation of stray light.

When a central thickness of the first lens element is CT1, and a central thickness of the third lens element is CT3, the following condition can be satisfied: 1.0<CT3/CT1<3.0. Therefore, it is favorable for enhancing the refractive power of the third lens element while providing a sufficient central thickness of the first lens element with improved manufacturability.

When the focal length of the optical photographing lens assembly is f, a curvature radius of an object-side surface of the fifth lens element is R9, and a curvature radius of an image-side surface of the fifth lens element is R10, the following condition can be satisfied: |f/R9|+|f/R10|<3.50. Therefore, it is favorable for preventing excessive curvature of the fifth lens element so as to enhance the manufacturability and prevent the generation of stray light.

When the focal length of the optical photographing lens assembly is f, a curvature radius of the object-side surface of the sixth lens element is R11, and a curvature radius of the image-side surface of the sixth lens element is R12, the following condition can be satisfied: |f/R11|−|f/R12|<2.70. Therefore, it is favorable for preventing excessive curvature of the sixth lens element so as to enhance the manufacturability and prevent the generation of stray light.

When an axial distance between the object-side surface of the first lens element and the image-side surface of the seventh lens element is TD, and an entrance pupil diameter of the optical photographing lens assembly is EPD, the following condition can be satisfied: 0.8<TD/EPD<2.0. Therefore, it is favorable for balancing the aperture size and the total track length of the optical photographing lens assembly to satisfy the demand for specifications with a large aperture and a short total track length.

Each of the aforementioned features of the optical photographing lens assembly can be utilized in numerous combinations, so as to achieve the corresponding functionality.

According to the optical photographing lens assembly of the present disclosure, the lens elements thereof can be made of a plastic material or a glass material. When the lens elements are made of a plastic material, the manufacturing cost can be effectively reduced. When the lens elements are made of a glass material, the arrangement of the refractive power of the optical photographing lens assembly may be more flexible to design. Furthermore, surfaces of each lens element can be arranged to be aspheric (ASP), since the aspheric surface of the lens element is easy to form a shape other than spherical surface so as to have more controllable variables for eliminating aberrations thereof, and to further decrease the required number of the lens elements. Therefore, the total track length of the optical photographing lens assembly can also be reduced.

According to the optical photographing lens assembly of the present disclosure, when a surface of a lens element is aspheric, it indicates that the complete optical effective area or a partial of the optical effective area of the surface of the lens element can be aspheric.

According to the optical photographing lens assembly of the present disclosure, each of an object-side surface and an image-side surface of a lens element has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the optical photographing lens assembly of the present disclosure, the refractive power of a lens element being positive or negative or the focal length of the lens element may refer to the refractive power or the focal length in the paraxial region of the lens element.

According to the optical photographing lens assembly of the present disclosure, the optical photographing lens assembly can include at least one stop, such as an aperture stop, a glare stop or a field stop. The glare stop or the field stop is for eliminating the stray light and thereby improving the image resolution thereof.

According to the optical photographing lens assembly of the present disclosure, the image surface, depending on the corresponding image sensor, can be a planar surface or a curved surface, particularly a curved surface being concave toward the object side. According to the optical photographing lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface facing toward the object side and is disposed close to the image surface.

According to the optical photographing lens assembly of the present disclosure, an aperture stop can be configured as a front stop or a middle stop. A front stop disposed between an imaged object and the first lens element can provide a longer distance between an exit pupil of the optical photographing lens assembly and the image surface to enable a telecentric effect, and thereby can improve the image-sensing efficiency of an image sensor. A middle stop disposed between the first lens element and the image surface is favorable for enlarging the field of view of the optical photographing lens assembly and thereby provides a wider field of view for the same.

According to the optical photographing lens assembly of the present disclosure, a critical point is a non-axial point of the lens surface where its tangent is perpendicular to the optical axis.

According to the optical photographing lens assembly of the present disclosure, the optical photographing lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles, and other electronic imaging products.

According to the present disclosure, an imaging apparatus is provided. The imaging apparatus includes the aforementioned optical photographing lens assembly according to the present disclosure and an image sensor, wherein the image sensor is disposed on or near the image surface of the aforementioned optical photographing lens assembly. With the optical photographing lens assembly having seven lens elements, the imaging functionality in an off-axis region can be enhanced, which is more apparent under the configuration of large aperture. With the third lens element having stronger positive refractive power, the lens element with significant positive refractive power of the optical photographing lens assembly can be shifted toward the image surface, so that the field of view can be enlarged, and the manufacturing sensitivity of the optical photographing lens assembly can be reduced so as to enhance the manufacturability. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following 1st-15th specific embodiments are provided for further explanation.

1st Embodiment

Figure 2:
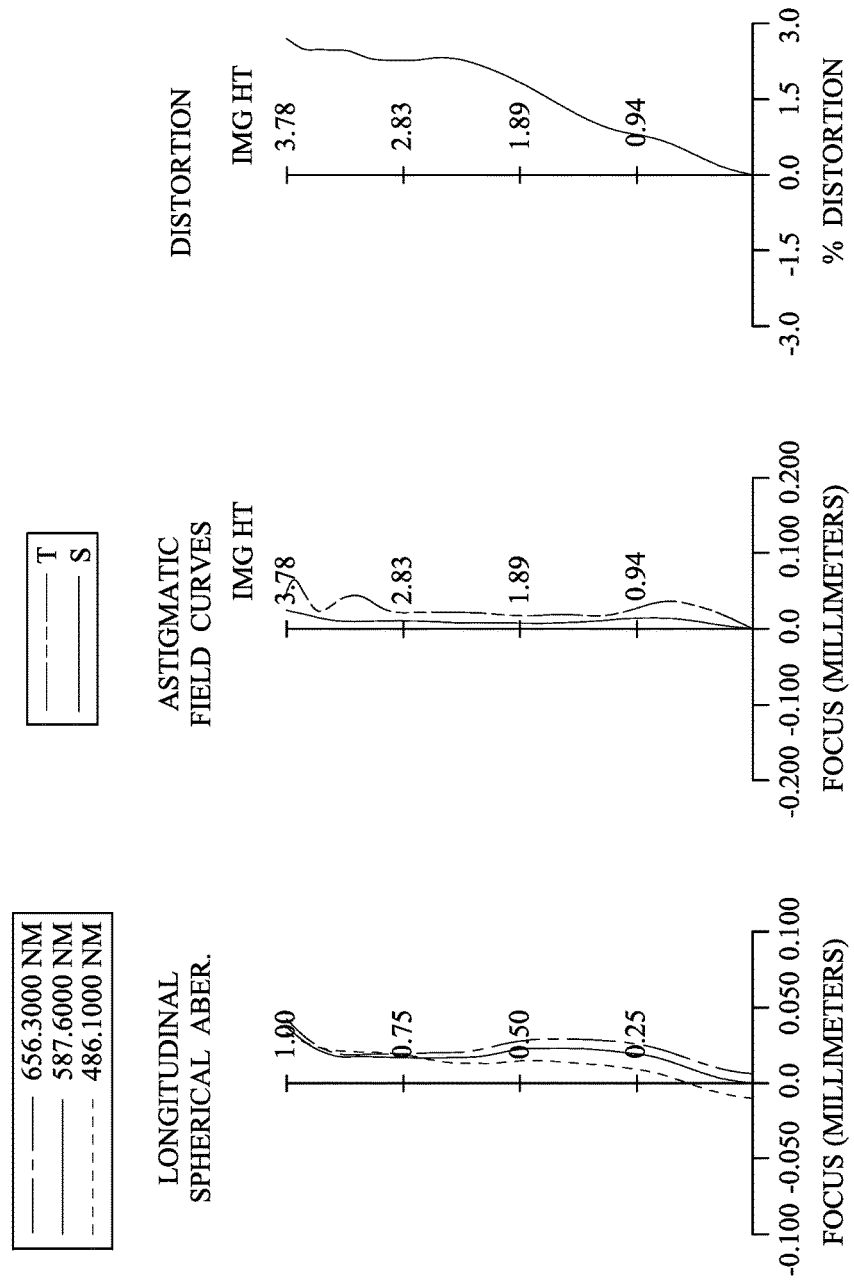
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an optical photographing lens assembly (its reference numeral is omitted) and an image sensor 195. The optical photographing lens assembly includes, in order from an object side to an image side, a first lens element 110, an aperture stop 100, a second lens element 120, a third lens element 130, a fourth lens element 140, a fifth lens element 150, a sixth lens element 160, a seventh lens element 170, an IR-cut filter 180 and an image surface 190. The image sensor 195 is disposed on the image surface 190 of the optical photographing lens assembly. The optical photographing lens assembly includes seven lens elements (110, 120, 130, 140, 150, 160 and 170) without additional one or more lens elements inserted between the first lens element 110 and the seventh lens element 170.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Moreover, the object-side surface 161 of the sixth lens element 160 includes at least one concave shape in an off-axis region thereof, and the image-side surface 162 of the sixth lens element 160 includes at least one convex shape in an off-axis region thereof.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Moreover, the image-side surface 172 of the seventh lens element 170 includes at least one convex shape in an off-axis region thereof.

The IR-cut filter 180 is made of a glass material and located between the seventh lens element 170 and the image surface 190, and will not affect the focal length of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=4.02 mm; Fno=1.85; and HFOV=42.3 degrees.

In the optical photographing lens assembly according to the 1st embodiment, when the maximum field of view of the optical photographing lens assembly is FOV, the following condition is satisfied: FOV=84.60 degrees.

In the optical photographing lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, and a maximum of N1, N2, N3, N4, N5, N6 and N7 is Nmax, that is, the maximum of the refractive indexes of all the lens elements of the optical photographing lens assembly is Nmax (i.e., the refractive index of the second lens element 120 N2 in the 1st embodiment), the following condition is satisfied: Nmax=1.688.

In the optical photographing lens assembly according to the 1st embodiment, when a total number of lens elements having Abbe numbers less than 20 is V20, the following condition is satisfied: V20=1. Specifically, in the optical photographing lens assembly according to the 1st embodiment, the second lens element 120 has an Abbe number (18.7) less than 20.

In the optical photographing lens assembly according to the 1st embodiment, when a total number of lens elements having Abbe numbers less than 30 is V30, the following condition is satisfied: V30=4. Specifically, in the optical photographing lens assembly according to the 1st embodiment, each of the second lens element 120 (Abbe number=18.7), the fourth lens element 140 (Abbe number=21.8), the fifth lens element 150 (Abbe number=27.9) and the sixth lens element 160 (Abbe number=27.8) has an Abbe number less than 30.

In the optical photographing lens assembly according to the 1st embodiment, when a curvature radius of the object-side surface 141 of the fourth lens element 140 is R7, and a curvature radius of the image-side surface 142 of the fourth lens element 140 is R8, the following condition is satisfied: R8/|R7|=−1.66.

In the optical photographing lens assembly according to the 1st embodiment, when the focal length of the optical photographing lens assembly is f, and a curvature radius of the object-side surface 171 of the seventh lens element 170 is R13, the following condition is satisfied: f/R13=1.63.

In the optical photographing lens assembly according to the 1st embodiment, when a central thickness of the first lens element 110 is CT1, and a central thickness of the third lens element 130 is CT3, the following condition is satisfied: CT3/CT1=1.84.

In the optical photographing lens assembly according to the 1st embodiment, when an axial distance between the third lens element 130 and the fourth lens element 140 is T34, and an axial distance between the fourth lens element 140 and the fifth lens element 150 is T45, the following condition is satisfied: T34/T45=7.50.

In the optical photographing lens assembly according to the 1st embodiment, when an axial distance between the object-side surface 111 of the first lens element 110 and the image-side surface 172 of the seventh lens element 170 is TD, and an entrance pupil diameter of the optical photographing lens assembly is EPD, the following condition is satisfied: TD/EPD=2.17.

In the optical photographing lens assembly according to the 1st embodiment, when an axial distance between the object-side surface 111 of the first lens element 110 and the image surface 190 is TL, and a maximum image height of the optical photographing lens assembly is ImgH (half of a diagonal length of an effective photosensitive area of the image sensor 195), the following condition is satisfied: TL/ImgH=1.48.

In the optical photographing lens assembly according to the 1st embodiment, when the focal length of the optical photographing lens assembly is f, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following conditions are satisfied: |f/R9|+|f/R10|=2.32; and |f/R11|+|f/R12|=0.34.

In the optical photographing lens assembly according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, and a focal length of the seventh lens element 170 is f7, the following conditions are satisfied: |f3/f1|=0.32; |f3/f2|=0.23; |f3/f4|=0.42; |f3/f5|=0.33; |f3/f6|=0.07; and |f3/f7|=0.32.

In the optical photographing lens assembly according to the 1st embodiment, when the focal length of the first lens element 110 is f1, the focal length of the second lens element 120 is f2, the focal length of the fourth lens element 140 is f4, the focal length of the fifth lens element 150 is f5, the focal length of the sixth lens element 160 is f6, and the focal length of the seventh lens element 170 is f7, the following conditions are satisfied: |f7/f1|=0.98; |f7/f2|=0.72; |f7/f4|=1.29; |f7/f5|=1.02; and |f7/f6|=0.21.

In the optical photographing lens assembly according to the 1st embodiment, when the focal length of the optical photographing lens assembly is f, and the focal length of the third lens element 130 is f3, the following condition is satisfied: f/f3=1.01.

Figure 23:
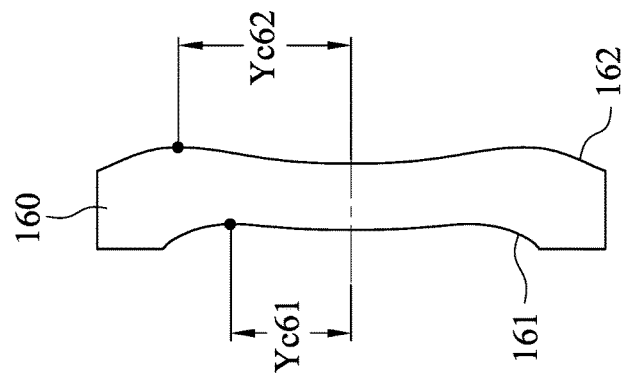
FIG. 23 is a schematic view showing parameters of Yc61 and Yc62 of the imaging apparatus according to the 1st embodiment in FIG. 1.

FIG. 23 is a schematic view showing parameters of Yc61 and Yc62 of the imaging apparatus according to the 1st embodiment in FIG. 1. In the optical photographing lens assembly according to the 1st embodiment, when a vertical distance between a non-axial critical point on the object-side surface 161 of the sixth lens element 160 and the optical axis is Yc61, and a vertical distance between a non-axial critical point on the image-side surface 162 of the sixth lens element 160 and the optical axis is Yc62, the following condition is satisfied: Yc61/Yc62=0.69.

Figure 24:
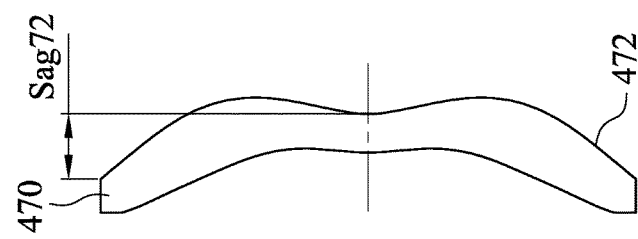
FIG. 24 is a schematic view showing a parameter of Sag72 of the imaging apparatus according to the 4th embodiment in FIG. 7.

In the optical photographing lens assembly according to the 1st embodiment, when a displacement in parallel with the optical axis from an axial vertex on the image-side surface 172 of the seventh lens element 170 to a maximum effective radius position on the image-side surface 172 of the seventh lens element 170 is Sag72 (wherein the displacement towards the object side of the optical photographing lens assembly is negative, and the displacement towards the image side of the optical photographing lens assembly is positive, Sag72 can refer to FIG. 24), and a central thickness of the seventh lens element 170 is CT7, the following condition is satisfied: |Sag72|/CT7=0.11.

In the optical photographing lens assembly according to the 1st embodiment, the optical photographing lens assembly includes two adjacent lens elements having Abbe numbers less than 30, i.e., the two adjacent lens elements are the fourth lens element 140 (Abbe number=21.8) and the fifth lens element 150 (Abbe number=27.9), or the two adjacent lens elements are the fifth lens element 150 (Abbe number=27.9) and the sixth lens element 160 (Abbe number=27.8).

The detailed optical data of the 1st embodiment are shown in TABLE 1 and the aspheric surface data are shown in TABLE 2 below.

TABLE 1

1st Embodiment
f = 4.02 mm, Fno = 1.85, HFOV = 42.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.666 | ASP | 0.361 | Plastic | 1.544 | 56.0 | 12.50 |
| 2 | | 4.176 | ASP | 0.117 | | | | |
| 3 | Ape. Stop | Plano | | −0.067 | | | | |
| 4 | Lens 2 | 2.487 | ASP | 0.200 | Plastic | 1.688 | 18.7 | −16.96 |
| 5 | | 1.983 | ASP | 0.190 | | | | |
| 6 | Lens 3 | 3.819 | ASP | 0.663 | Plastic | 1.544 | 56.0 | 3.97 |
| 7 | | −4.653 | ASP | 0.450 | | | | |
| 8 | Lens 4 | −2.307 | ASP | 0.200 | Plastic | 1.640 | 21.8 | −9.51 |
| 9 | | −3.839 | ASP | 0.060 | | | | |
| 10 | Lens 5 | 2.819 | ASP | 0.336 | Plastic | 1.586 | 27.9 | 12.07 |
| 11 | | 4.480 | ASP | 0.511 | | | | |
| 12 | Lens 6 | 35.180 | ASP | 0.656 | Plastic | 1.609 | 27.8 | −57.90 |
| 13 | | 17.480 | ASP | 0.114 | | | | |
| 14 | Lens 7 | 2.469 | ASP | 0.939 | Plastic | 1.576 | 36.4 | −12.28 |
| 15 | | 1.576 | ASP | 0.450 | | | | |
| 16 | IR-cut filter | Plano | | 0.100 | Glass | 1.517 | 64.2 | — |
| 17 | | Plano | | 0.303 | | | | |
| 18 | Image | Plano | | — | | | | |

Reference wavelength is 587.6 nm (d-line).
The effective radius of the surface 5 is 1.070 mm.

TABLE 2

Aspheric Coefficients

| Surface # | 1 | 2 | 4 | 5 | 6 | 7 | 8 |
|---|---|---|---|---|---|---|---|
| k = | −1.7927E+00 | −3.2067E+00 | −1.3537E+01 | −5.4665E+00 | −6.7992E+01 | −8.2489E+01 | 2.3891E−01 |
| A4 = | 1.7765E−03 | 4.4050E−03 | 5.3101E−02 | −1.2328E−03 | 9.3322E−02 | −1.7129E−01 | −1.4902E−01 |
| A6 = | −4.0872E−02 | −1.0793E−01 | −1.5893E−01 | −6.2908E−02 | −1.7794E−01 | 1.4409E−01 | 2.4554E−01 |
| A8 = | 1.0971E−01 | 2.9057E−01 | 2.7039E−01 | 4.0266E−01 | −7.8109E−02 | −1.9185E−01 | −4.3316E−01 |
| A10 = | −3.2922E−01 | −1.0504E+00 | −2.0868E−01 | −1.2502E+00 | 1.2220E+00 | 1.7558E−01 | 7.2257E−01 |
| A12 = | 5.6455E−01 | 2.4342E+00 | −4.5672E−01 | 2.3289E+00 | −3.1866E+00 | −1.0557E−01 | −7.9584E−01 |
| A14 = | −5.7753E−01 | −3.3352E+00 | 1.4442E+00 | −2.7585E+00 | 4.3622E+00 | 4.6672E−02 | 5.4599E−01 |
| A16 = | 3.5035E−01 | 2.7023E+00 | −1.6441E+00 | 2.0205E+00 | −3.4298E+00 | −2.0515E−02 | −2.3170E−01 |
| A18 = | −1.1528E−01 | −1.1979E+00 | 8.9304E−01 | −8.2814E−01 | 1.4590E+00 | 5.4913E−03 | 5.7121E−02 |
| A20 = | 1.5854E−02 | 2.2477E−01 | −1.9261E−01 | 1.4511E−01 | −2.5857E−01 | 3.2048E−04 | −6.2677E−03 |

| Surface # | 9 | 10 | 11 | 12 | 13 | 14 | 15 |
|---|---|---|---|---|---|---|---|
| k = | −1.7125E+01 | 2.4106E−01 | −4.4726E+00 | 0.0000E+00 | 0.0000E+00 | −3.7386E+00 | −9.8883E−01 |
| A4 = | −2.1283E−01 | −1.7629E−02 | 1.3176E−01 | 1.2371E−01 | 1.0632E−01 | −9.6019E−02 | −1.5365E−01 |
| A6 = | 1.8212E−01 | −8.8915E−02 | −2.5212E−01 | −1.5706E−01 | −9.5019E−02 | 3.7019E−02 | 6.8362E−02 |
| A8 = | −1.5039E−02 | 1.6230E−01 | 2.7556E−01 | 1.0813E−01 | 4.8510E−02 | −1.9099E−02 | −2.6138E−02 |
| A10 = | −1.9947E−01 | −1.7277E−01 | −1.9158E−01 | −5.5111E−02 | −1.8348E−02 | 1.0131E−02 | 7.2586E−03 |
| A12 = | 3.2740E−01 | 1.1821E−01 | 8.4473E−02 | 1.7760E−02 | 5.1756E−03 | −3.5133E−03 | −1.3794E−03 |
| A14 = | −2.8708E−01 | −5.7427E−02 | −2.3429E−02 | −2.3123E−03 | −1.0421E−03 | 7.2875E−04 | 1.7194E−04 |
| A16 = | 1.4585E−01 | 1.9640E−02 | 3.9096E−03 | −5.3751E−04 | 1.3722E−04 | −8.8284E−05 | −1.3312E−05 |
| A18 = | −4.0221E−02 | −4.2562E−03 | −3.4826E−04 | 2.4990E−04 | −1.0322E−05 | 5.7970E−06 | 5.7741E−07 |
| A20 = | 4.7020E−03 | 4.2589E−04 | 1.1677E−05 | −2.7846E−05 | 3.3193E−07 | −1.6019E−07 | −1.0695E−08 |

In TABLE 1, the curvature radius, the thickness and the focal length are shown in millimeters (mm). Surface numbers 0-18 represent the surfaces sequentially arranged from the object-side to the image-side along the optical axis. In TABLE 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
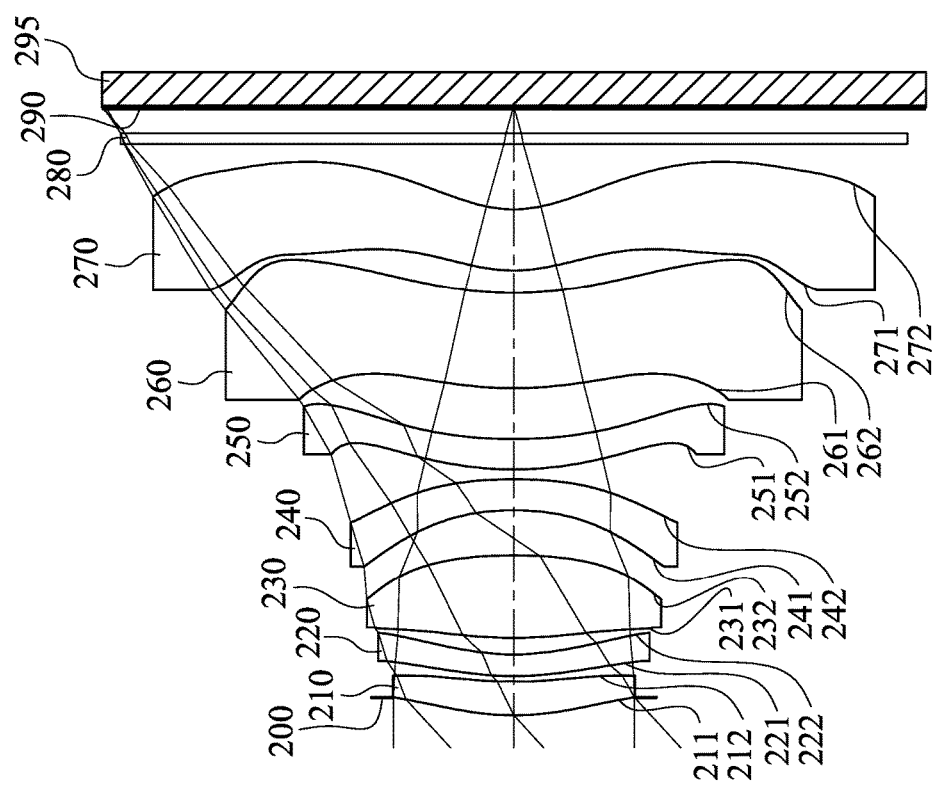
FIG. 3 is a schematic view of an imaging apparatus according to the 2nd embodiment of the present disclosure.
Figure 4:
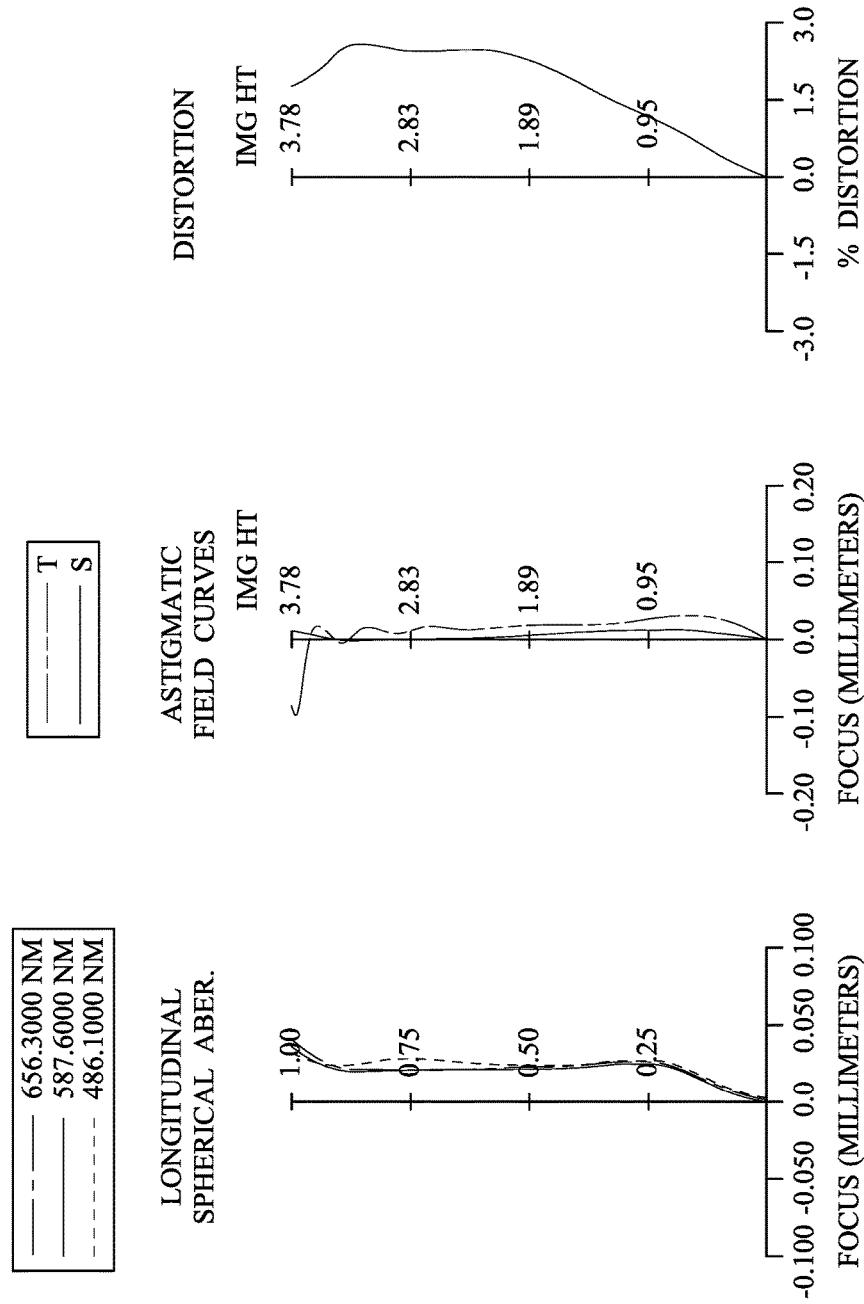
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an optical photographing lens assembly (its reference numeral is omitted) and an image sensor 295. The optical photographing lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290. The image sensor 295 is disposed on the image surface 290 of the optical photographing lens assembly. The optical photographing lens assembly includes seven lens elements (210, 220, 230, 240, 250, 260 and 270) without additional one or more lens elements inserted between the first lens element 210 and the seventh lens element 270.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

Furthermore, in the 2nd embodiment, the aperture stop 200 is disposed on the object-side surface 211 of the first lens element 210.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Moreover, the object-side surface 261 of the sixth lens element 260 includes at least one concave shape in an off-axis region thereof, and the image-side surface 262 of the sixth lens element 260 includes at least one convex shape in an off-axis region thereof.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Moreover, the image-side surface 272 of the seventh lens element 270 includes at least one convex shape in an off-axis region thereof.

The IR-cut filter 280 is made of a glass material and located between the seventh lens element 270 and the image surface 290, and will not affect the focal length of the optical photographing lens assembly.

The detailed optical data of the 2nd embodiment are shown in TABLE 3 and the aspheric surface data are shown in TABLE 4 below.

TABLE 3

2nd Embodiment
f = 4.02 mm, Fno = 1.81, HFOV = 42.6 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Lens 1* | 2.696 | ASP | 0.309 | Plastic | 1.544 | 66.0 | 11.70 |
| 2 | | 4.487 | ASP | 0.050 | | | | |
| 3 | Lens 2 | 2.937 | ASP | 0.200 | Plastic | 1.688 | 18.7 | −16.76 |
| 4 | | 2.276 | ASP | 0.151 | | | | |
| 5 | Lens 3 | 3.928 | ASP | 0.766 | Plastic | 1.544 | 56.0 | 4.05 |
| 6 | | −4.685 | ASP | 0.416 | | | | |
| 7 | Lens 4 | −2.538 | ASP | 0.285 | Plastic | 1.669 | 19.5 | −9.00 |
| 8 | | −4.586 | ASP | 0.090 | | | | |
| 9 | Lens 5 | 3.648 | ASP | 0.280 | Plastic | 1.529 | 45.4 | 17.66 |
| 10 | | 5.824 | ASP | 0.468 | | | | |
| 11 | Lens 6 | 4.155 | ASP | 0.879 | Plastic | 1.544 | 56.0 | −134.05 |
| 12 | | 3.638 | ASP | 0.209 | | | | |
| 13 | Lens 7 | 1.464 | ASP | 0.563 | Plastic | 1.515 | 56.5 | −27.41 |
| 14 | | 1.153 | | 0.600 | | | | |
| 15 | IR-cut filter | Plano | | 0.100 | Glass | 1.517 | 64.2 | — |
| 16 | | Plano | | 0.237 | | | | |
| 17 | Image | Plano | | — | | | | |

Reference wavelength is 587.6 nm (d-line).
*Aperture stop is disposed on the surface 1.
The effective radius of the surface 4 is 1.250 mm.

TABLE 4

Aspheric Coefficients

| Surface # | 1 | 2 | 3 | 4 | 5 | 6 | 7 |
|---|---|---|---|---|---|---|---|
| k = | −2.1446E+00 | −3.8139E+01 | −1.9935E+01 | −8.8005E+00 | −7.7556E+01 | −9.0000E+01 | 4.2519E−01 |
| A4 = | −1.4211E−02 | 2.3771E−02 | 1.1461E−02 | −2.4928E−02 | 9.5554E−02 | −1.5976E−01 | −1.1248E−01 |
| A6 = | 7.6520E−02 | −5.7654E−03 | 5.7395E−02 | 6.5020E−02 | −2.9674E−01 | 1.4750E−01 | 1.7441E−01 |
| A8 = | −5.3500E−01 | −3.1457E−01 | −3.4639E−01 | −9.8149E−02 | 6.1715E−01 | −1.9119E−01 | −3.9394E−01 |
| A10 = | 1.6117E+00 | 7.3337E−01 | 6.8601E−01 | −1.0418E−02 | −1.0226E+00 | 1.5276E−01 | 7.1060E−01 |
| A12 = | −3.0163E+00 | −1.0666E+00 | −8.8859E−01 | 2.0079E−01 | 1.2081E+00 | −4.1739E−02 | −8.2180E−01 |
| A14 = | 3.5171E+00 | 1.1283E+00 | 8.5774E−01 | −2.6958E−01 | −9.6939E−01 | −4.6274E−02 | 6.0343E−01 |
| A16 = | −2.4820E+00 | −7.8421E−01 | −5.5953E−01 | 1.7231E−01 | 4.9570E−01 | 5.3542E−02 | −2.7298E−01 |
| A18 = | 9.7150E−01 | 3.0929E−01 | 2.0820E−01 | −5.5490E−02 | −1.4271E−01 | −2.2437E−02 | 6.9143E−02 |
| A20 = | −1.6172E−01 | −5.1737E−02 | −3.2958E−02 | 7.1179E−03 | 1.7389E−02 | 3.5907E−03 | −7.4541E−03 |

| Surface # | 8 | 9 | 10 | 11 | 12 | 13 | 14 |
|---|---|---|---|---|---|---|---|
| k = | −4.8271E+01 | 3.0517E+00 | 1.1849E+00 | 0.0000E+00 | −5.6456E−01 | −5.9934E+00 | −1.0982E+00 |
| A4 = | −1.5400E−01 | 6.8342E−02 | 1.2479E−01 | 3.9911E−02 | −6.6977E−03 | −4.5068E−02 | −2.1785E−01 |
| A6 = | 1.2342E−01 | −1.8380E−01 | −2.0654E−01 | −1.1087E−01 | 9.1720E−05 | −6.0137E−02 | 9.1446E−02 |
| A8 = | −1.4141E−01 | 2.2209E−01 | 2.1420E−01 | 1.0873E−01 | −7.7328E−03 | 6.8045E−02 | −2.9427E−02 |
| A10 = | 1.8783E−01 | −1.6796E−01 | −1.3957E−01 | −8.4460E−02 | 5.7386E−03 | −3.5063E−02 | 6.8952E−03 |
| A12 = | −1.7966E−01 | 7.6414E−02 | 5.6695E−02 | 4.7331E−02 | −2.2343E−03 | 1.0864E−02 | −1.1394E−03 |
| A14 = | 1.0933E−01 | −2.0152E−02 | −1.4437E−02 | −1.7846E−02 | 5.4812E−04 | −2.0676E−03 | 1.2834E−04 |
| A16 = | −4.0419E−02 | 2.3495E−03 | 2.2358E−03 | 4.2069E−03 | −8.2988E−05 | 2.3324E−04 | −9.2793E−06 |
| A18 = | 8.2460E−03 | 9.9614E−05 | −1.9098E−04 | −5.5038E−04 | 6.8469E−06 | −1.4227E−05 | 3.8432E−07 |
| A20 = | −7.0120E−04 | −4.0872E−05 | 6.7156E−06 | 3.0097E−05 | −2.3077E−07 | 3.6068E−07 | −6.8827E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 4.02 | \|f3/f1\| | 0.35 |
| Fno | 1.81 | \|f3/f2\| | 0.24 |
| HFOV (deg.) | 42.6 | \|f3/f4\| | 0.45 |
| FOV (deg.) | 85.20 | \|f3/f5\| | 0.23 |
| Nmax | 1.688 | \|f3/f6\| | 0.03 |
| V20 | 2 | \|f3/f7\| | 0.15 |
| V30 | 2 | \|f7/f1\| | 2.34 |
| R8/\|R7\| | −1.81 | \|f7/f2\| | 1.64 |
| f/R13 | 2.75 | \|f7/f4\| | 3.05 |
| CT3/CT1 | 2.48 | \|f7/f5\| | 1.55 |
| T34/T45 | 4.62 | \|f7/f6\| | 0.20 |
| TD/EPD | 2.10 | f/f3 | 0.99 |
| TL/ImgH | 1.48 | Yc61/Yc62 | 0.64 |
| \|f/R9\| + \|f/R10\| | 1.79 | \|Sag72\|/CT7 | 0.21 |
| \|f/R11\| + \|f/R12\| | 2.07 | | |

3rd Embodiment

Figure 5:
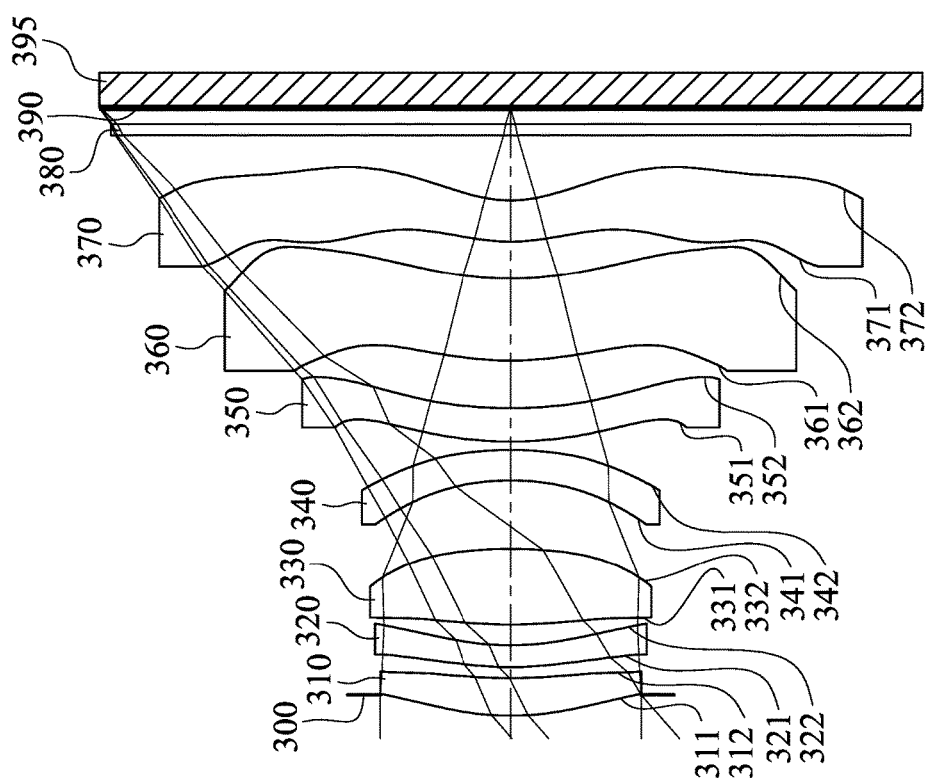
FIG. 5 is a schematic view of an imaging apparatus according to the 3rd embodiment of the present disclosure.
Figure 6:
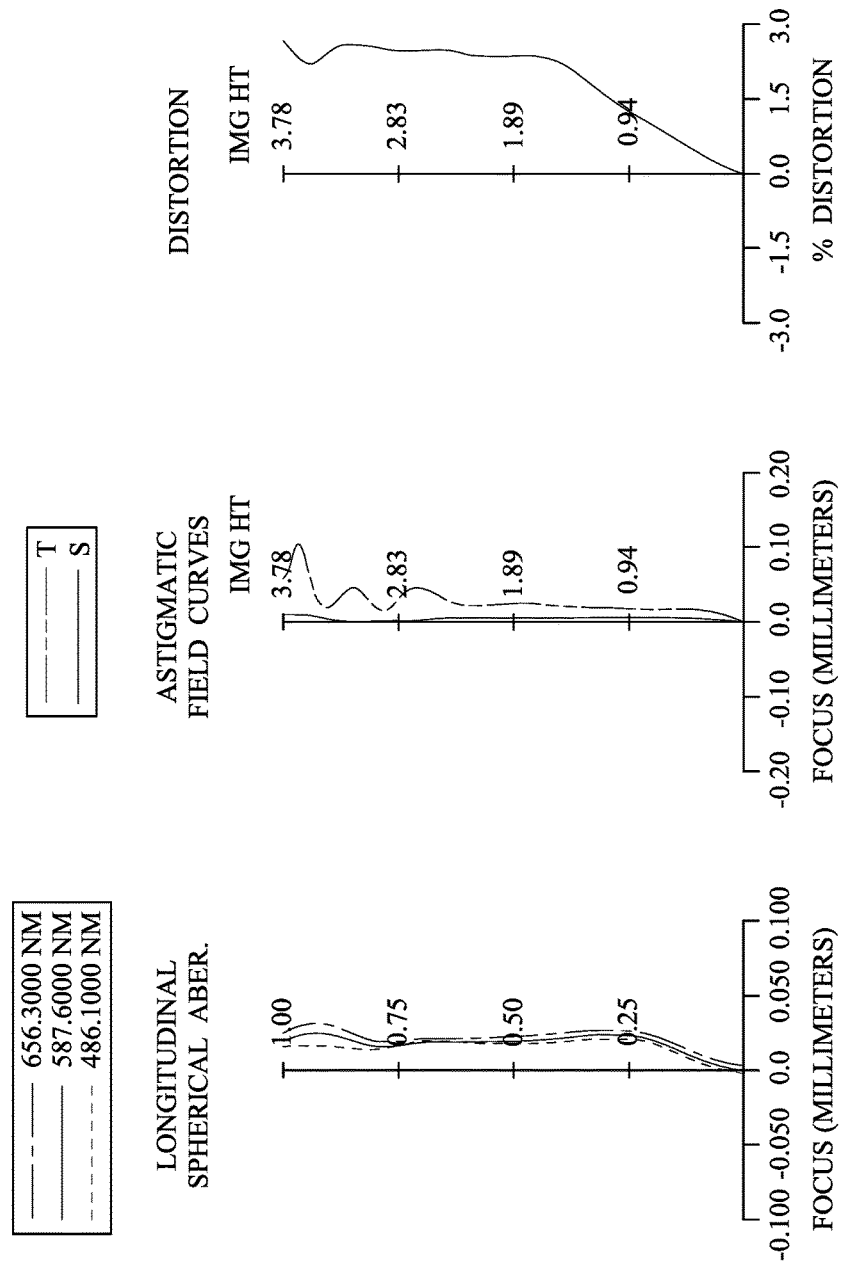
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an optical photographing lens assembly (its reference numeral is omitted) and an image sensor 395. The optical photographing lens assembly includes, in order from an object side to an image side, an aperture stop 300, a first lens element 310, a second lens element 320, a third lens element 330, a fourth lens element 340, a fifth lens element 350, a sixth lens element 360, a seventh lens element 370, an IR-cut filter 380 and an image surface 390. The image sensor 395 is disposed on the image surface 390 of the optical photographing lens assembly. The optical photographing lens assembly includes seven lens elements (310, 320, 330, 340, 350, 360 and 370) without additional one or more lens elements inserted between the first lens element 310 and the seventh lens element 370.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric.

The sixth lens element 360 with positive refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Moreover, the object-side surface 361 of the sixth lens element 360 includes at least one concave shape in an off-axis region thereof, and the image-side surface 362 of the sixth lens element 360 includes at least one convex shape in an off-axis region thereof.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Moreover, the image-side surface 372 of the seventh lens element 370 includes at least one convex shape in an off-axis region thereof. Furthermore, the object-side surface 371 of the seventh lens element 370 includes at least two critical points.

The IR-cut filter 380 is made of a glass material and located between the seventh lens element 370 and the image surface 390, and will not affect the focal length of the optical photographing lens assembly.

The detailed optical data of the 3rd embodiment are shown in TABLE 5 and the aspheric surface data are shown in TABLE 6 below.

TABLE 5

3rd Embodiment
f = 4.21 mm, Fno = 1.75, HFOV = 41.1 deg.

| Surface # | | Curvature Radius | Thickness | Material Index | Abbe # | Focal Length |
|---|---|---|---|---|---|---|
| 0 | Object | Plano | Infinity | | | |
| 1 | Ape. Stop | Plano | −0.191 | | | |

TABLE 5-continued

3rd Embodiment
f = 4.21 mm, Fno = 1.75, HFOV = 41.1 deg.

| Surface # | | Curvature Radius | Thickness | | Material | Index | Abbe # | Focal Length |
|---|---|---|---|---|---|---|---|---|
| 2 | Lens 1 | 2.632 | ASP | 0.346 | Plastic | 1.544 | 56.0 | 9.20 |
| 3 | | 5.293 | ASP | 0.101 | | | | |
| 4 | Lens 2 | 3.356 | ASP | 0.200 | Plastic | 1.688 | 18.7 | -13.70 |
| 5 | | 2.414 | ASP | 0.191 | | | | |
| 6 | Lens 3 | 4.626 | ASP | 0.701 | Plastic | 1.544 | 56.0 | 4.37 |
| 7 | | -4.637 | ASP | 0.630 | | | | |
| 8 | Lens 4 | -2.602 | ASP | 0.280 | Plastic | 1.669 | 19.5 | -13.42 |
| 9 | | -3.822 | ASP | 0.079 | | | | |
| 10 | Lens 5 | 4.065 | ASP | 0.308 | Plastic | 1.529 | 45.4 | 27.09 |
| 11 | | 5.525 | ASP | 0.437 | | | | |
| 12 | Lens 6 | 3.395 | ASP | 0.757 | Plastic | 1.544 | 56.0 | 44.70 |
| 13 | | 3.636 | ASP | 0.342 | | | | |
| 14 | Lens 7 | 1.801 | ASP | 0.379 | Plastic | 1.515 | 56.5 | -8.18 |
| 15 | | 1.171 | ASP | 0.600 | | | | |
| 16 | IR-cut filter | Plano | | 0.100 | Glass | 1.517 | 64.2 | — |
| 17 | | Plano | | 0.151 | | | | |
| 18 | Image | Plano | | — | | | | |

Reference wavelength is 587.6 nm (d-line).
The effective radius of the surface 5 is 1.250 mm.
The effective radius of the surface 11 is 1.920 mm.

TABLE 6

Aspheric Coefficients

| Surface # | 2 | 3 | 4 | 5 | 6 | 7 | 8 |
|---|---|---|---|---|---|---|---|
| k = | -1.4185E+00 | -3.1761E+01 | -2.0000E+01 | -8.5285E+00 | -9.0000E+01 | -9.0000E+01 | -9.0187E-02 |
| A4 = | -1.3965E-02 | 6.7415E-03 | -7.1231E-03 | -2.1385E-02 | 5.7982E-02 | -1.5646E-01 | -8.9960E-02 |
| A6 = | 3.2068E-02 | -3.7090E-02 | 3.7383E-02 | 6.0532E-02 | -1.8399E-01 | 1.6327E-01 | 2.4752E-02 |
| A8 = | -2.1208E-01 | 2.5310E-02 | -1.2096E-01 | -1.0009E-01 | 4.0171E-01 | -2.5347E-01 | 5.1813E-02 |
| A10 = | 5.2110E-01 | -2.2279E-01 | 4.0532E-04 | -3.4939E-02 | -7.7496E-01 | 3.2507E-01 | -2.7216E-02 |
| A12 = | -8.2296E-01 | 5.5532E-01 | 3.1898E-01 | 2.9794E-01 | 1.0659E+00 | -3.3000E-01 | -5.0276E-02 |
| A14 = | 8.1986E-01 | -6.5463E-01 | -4.7174E-01 | -4.1613E-01 | -9.7899E-01 | 2.4039E-01 | 7.1891E-02 |
| A16 = | -4.9430E-01 | 4.3466E-01 | 3.3153E-01 | 2.8998E-01 | 5.6096E-01 | -1.1506E-01 | -3.9816E-02 |
| A18 = | 1.6566E-01 | -1.5711E-01 | -1.2206E-01 | -1.0465E-01 | -1.7735E-01 | 3.2090E-02 | 1.0767E-02 |
| A20 = | -2.3704E-02 | 2.4146E-02 | 1.8764E-02 | 1.5430E-02 | 2.3326E-02 | -3.9051E-03 | -1.2009E-03 |

| Surface # | 9 | 10 | 11 | 12 | 13 | 14 | 15 |
|---|---|---|---|---|---|---|---|
| k = | -3.0438E+01 | 1.7183E+00 | -1.7770E+00 | 0.0000E+00 | -7.7691E-01 | -7.2521E+00 | -1.1286E+00 |
| A4 = | -1.4975E-01 | 4.0140E-02 | 6.9461E-02 | -5.4736E-03 | 4.0466E-02 | -1.0754E-01 | -2.7727E-01 |
| A6 = | 8.0709E-02 | -7.0505E-03 | 1.0513E-02 | -4.4811E-02 | -8.0765E-02 | 9.8790E-03 | 1.4243E-01 |
| A8 = | -4.4895E-02 | -1.2103E-01 | -1.4053E-01 | 3.0265E-02 | 6.1659E-02 | 6.4919E-04 | -5.9391E-02 |
| A10 = | 7.8584E-02 | 1.8806E-01 | 1.7015E-01 | -1.3342E-02 | -3.1504E-02 | 3.9311E-03 | 1.7299E-02 |
| A12 = | -9.6976E-02 | -1.4609E-01 | -1.0537E-01 | 5.1504E-04 | 1.0461E-02 | -1.8233E-03 | -3.2820E-03 |
| A14 = | 6.2085E-02 | 6.7069E-02 | 3.8306E-02 | 2.0786E-03 | -2.1393E-03 | 3.3412E-04 | 3.9650E-04 |
| A16 = | -2.1492E-02 | -1.8762E-02 | -8.2680E-03 | -8.5005E-04 | 2.5578E-04 | -3.0750E-05 | -2.9450E-05 |
| A18 = | 3.8197E-03 | 2.9985E-03 | 9.8607E-04 | 1.4322E-04 | -1.6308E-05 | 1.4236E-06 | 1.2266E-06 |
| A20 = | -2.6863E-04 | -2.1452E-04 | -5.0369E-05 | -9.4263E-06 | 4.2766E-07 | -2.6703E-08 | -2.1929E-08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

3rd Embodiment

| | | | |
|---|---|---|---|
| f (mm) | 4.21 | |f3/f1| | 0.48 |
| Fno | 1.75 | |f3/f2| | 0.32 |
| HFOV (deg.) | 41.1 | |f3/f4| | 0.33 |
| FOV (deg.) | 82.20 | |f3/f5| | 0.16 |
| Nmax | 1.688 | |f3/f6| | 0.10 |
| V20 | 2 | |f3/f7| | 0.53 |
| V30 | 2 | |f7/f1| | 0.89 |
| R8/|R7| | -1.47 | |f7/f2| | 0.60 |
| f/R13 | 2.34 | |f7/f4| | 0.61 |
| CT3/CT1 | 2.03 | |f7/f5| | 0.30 |
| T34/T45 | 7.97 | |f7/f6| | 0.18 |
| TD/EPD | 1.98 | f/f3 | 0.96 |
| TL/ImgH | 1.48 | Yc61/Yc62 | 0.62 |
| |f/R9| + |f/R10| | 1.80 | |Sag72|/CT7 | 0.04 |
| |f/R11| + |f/R12| | 2.40 | | |

4th Embodiment

Figure 7:
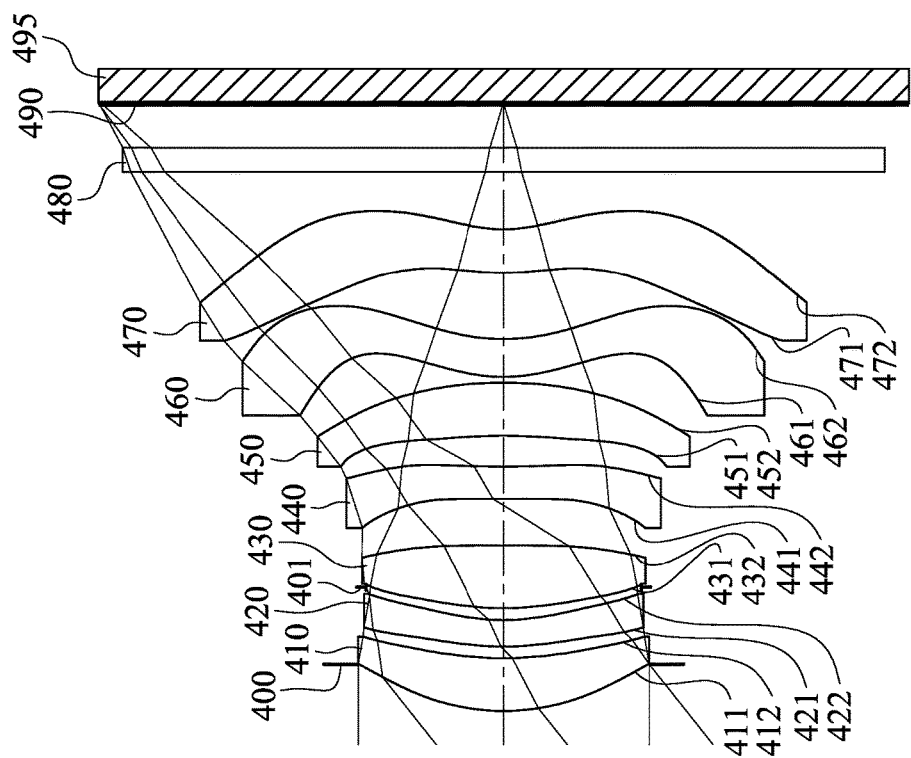
FIG. 7 is a schematic view of an imaging apparatus according to the 4th embodiment of the present disclosure.
Figure 8:
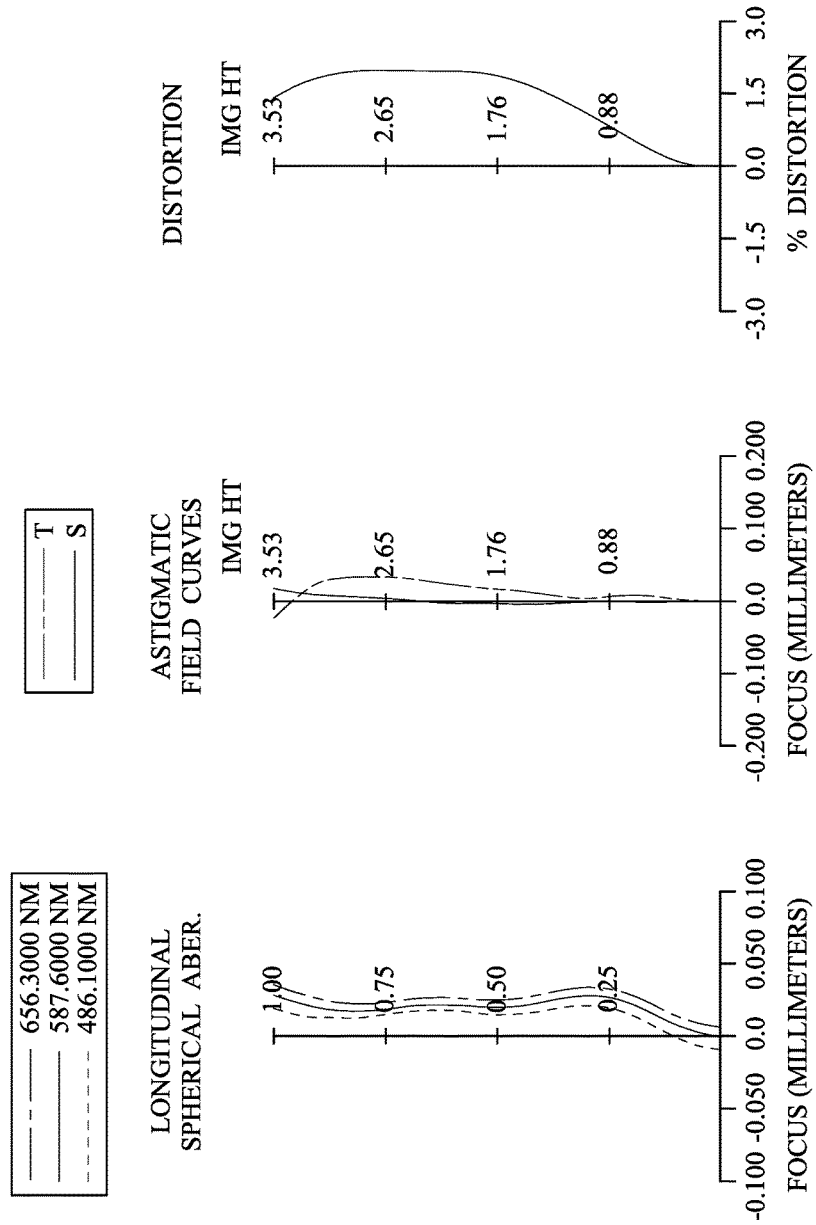
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an optical photographing lens assembly (its reference numeral is omitted) and an image sensor 495. The optical photographing lens assembly includes, in order from an object side to an image side, an aperture stop 400, a first lens element 410, a second lens element 420, a stop 401, a third lens element 430, a fourth lens element 440, a fifth lens element 450, a sixth lens element 460, a seventh lens element 470, an IR-cut filter 480 and an image surface 490. The image sensor 495 is disposed on the image surface 490 of the optical photographing lens assembly. The optical photographing lens assembly includes seven lens elements (410, 420, 430, 440, 450, 460 and 470) without additional one or more lens elements inserted between the first lens element 410 and the seventh lens element 470.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Moreover, the image-side surface 442 of the fourth lens element 440 includes at least one convex shape in an off axis region thereof.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Moreover, the object-side surface 461 of the sixth lens element 460 includes at least one concave shape in an off-axis region thereof, and the image-side surface 462 of the sixth lens element 460 includes at least one convex shape in an off-axis region thereof.

The seventh lens element 470 with negative refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Moreover, the image-side surface 472 of the seventh lens element 470 includes at least one convex shape in an off-axis region thereof.

The IR-cut filter 480 is made of a glass material and located between the seventh lens element 470 and the image surface 490, and will not affect the focal length of the optical photographing lens assembly.

The detailed optical data of the 4th embodiment are shown in TABLE 7 and the aspheric surface data are shown in TABLE 8 below.

TABLE 7

4th Embodiment
f = 4.36 mm, Fno = 1.72, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.407 | | | | |
| 2 | Lens 1 | 1.951 | ASP | 0.459 | Plastic | 1.545 | 56.1 | 7.90 |
| 3 | | 3.273 | ASP | 0.102 | | | | |
| 4 | Lens 2 | 2.643 | ASP | 0.230 | Plastic | 1.669 | 19.5 | −12.28 |
| 5 | | 1.930 | ASP | 0.286 | | | | |
| 6 | Stop | Plano | | −0.181 | | | | |
| 7 | Lens 3 | 2.870 | ASP | 0.550 | Plastic | 1.545 | 56.1 | 4.92 |
| 8 | | −38.336 | ASP | 0.404 | | | | |
| 9 | Lens 4 | 18.764 | ASP | 0.280 | Plastic | 1.669 | 19.5 | −15.87 |
| 10 | | 6.738 | ASP | 0.270 | | | | |
| 11 | Lens 5 | −4.180 | ASP | 0.461 | Plastic | 1.584 | 28.2 | 1394.31 |
| 12 | | −4.328 | ASP | 0.050 | | | | |
| 13 | Lens 6 | 1.448 | ASP | 0.330 | Plastic | 1.544 | 56.0 | 9.60 |
| 14 | | 1.843 | ASP | 0.579 | | | | |
| 15 | Lens 7 | 2.215 | ASP | 0.380 | Plastic | 1.534 | 55.9 | −6.13 |
| 16 | | 1.242 | ASP | 0.500 | | | | |

TABLE 7-continued

4th Embodiment
f = 4.36 mm, Fno = 1.72, HFOV = 38.5 deg.

| Surface # | | Curvature Radius | Thickness | Material | Index | Abbe # | Focal Length |
|---|---|---|---|---|---|---|---|
| 17 | IR-cut filter | Plano | 0.210 | Glass | 1.517 | 64.2 | — |
| 18 | | Plano | 0.383 | | | | |
| 19 | image | Plano | — | | | | |

Reference wavelength is 587.6 nm (d-line).
The effective radius of the surface 6 is 1.200 mm.

TABLE 8

Aspheric Coefficients

| Surface # | 2 | 3 | 4 | 5 | 7 | 8 | 9 |
|---|---|---|---|---|---|---|---|
| k= | −8.8477E−01 | −1.0145E+00 | −3.6066E−01 | −3.6607E+00 | 0.0000E+00 | −9.0000E+01 | −8.9224E+01 |
| A4= | 5.8078E−03 | −3.3810E−02 | −1.3007E−01 | −8.7082E−02 | −5.7041E−02 | −4.7728E−02 | −1.3622E−01 |
| A6= | 3.6661E−02 | 1.2913E−01 | 2.2578E−01 | 1.4967E−01 | 7.7865E−02 | −1.4156E−01 | −7.6599E−02 |
| A8= | −9.8970E−02 | −3.6607E−01 | −5.4576E−01 | −3.5507E−01 | −1.8098E−01 | 4.9291E−02 | 1.1509E−01 |
| A10= | 1.3228E−01 | 4.9377E−01 | 7.1730E−01 | 3.6062E−01 | 8.7900E−02 | −9.7091E−02 | −1.0580E−01 |
| A12= | −1.0528E−01 | −3.8559E−01 | −5.1069E−01 | −1.1675E−01 | 1.0094E−01 | 1.0673E−01 | 1.3460E−01 |
| A14= | 4.3749E−02 | 1.7255E−01 | 2.0070E−01 | −1.2444E−02 | −9.5993E−02 | −5.2248E−02 | −9.0774E−02 |
| A16= | −7.3894E−03 | −3.3280E−02 | −3.4808E−02 | 8.3582E−03 | 2.1318E−02 | 9.0482E−03 | 2.0301E−02 |

| Surface # | 10 | 11 | 12 | 13 | 14 | 15 | 16 |
|---|---|---|---|---|---|---|---|
| k= | −6.5125E+01 | −9.0000E+01 | −7.9621E+00 | −6.7083E+00 | −1.3062E+00 | −1.1522E+01 | −6.2900E+00 |
| A4= | −3.7762E−02 | 9.5696E−03 | −1.4021E−01 | 1.4901E−02 | −4.7956E−03 | −3.1975E−01 | −1.7390E−01 |
| A6= | −1.1313E−01 | 6.6753E−02 | 1.7672E−01 | −6.9175E−02 | −7.5501E−02 | 2.4911E−01 | 1.1186E−01 |
| A8= | 1.5909E−01 | −1.2047E−01 | −1.0392E−01 | 1.9201E−02 | 4.2611E−02 | −1.4517E−01 | −5.5861E−02 |
| A10= | −1.9168E−01 | 5.1395E−02 | 7.4404E−03 | −2.5351E−03 | −1.2972E−02 | 6.3018E−02 | 1.9375E−02 |
| A12= | 1.7970E−01 | −2.6689E−03 | 1.6034E−02 | −8.7115E−04 | 2.4198E−03 | −1.8697E−02 | −4.6577E−03 |
| A14= | −8.6578E−02 | −5.9721E−04 | −5.9727E−03 | 4.2500E−04 | −2.6716E−04 | 3.5917E−03 | 7.5835E−04 |
| A16= | 1.5734E−02 | −7.6006E−04 | 6.3961E−04 | −4.3220E−05 | 1.3193E−05 | −4.2505E−04 | −7.8550E−05 |
| A18= | | | | | | 2.8166E−05 | 4.6061E−06 |
| A20= | | | | | | −8.0078E−07 | −1.1525E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.36 | |f3/f1| | 0.62 |
| Fno | 1.72 | |f3/f2| | 0.40 |
| HFOV (deg.) | 38.5 | |f3/f4| | 0.31 |
| FOV (deg.) | 77.00 | |f3/f5| | 0.004 |
| Nmax | 1.669 | |f3/f6| | 0.51 |
| V20 | 2 | |f3/f7| | 0.80 |
| V30 | 3 | |f7/f1| | 0.78 |
| R8/|R7| | 0.36 | |f7/f2| | 0.50 |
| f/R13 | 1.97 | |f7/f4| | 0.39 |
| CT3/CT1 | 1.20 | |f7/f5| | 0.004 |
| T34/T45 | 1.50 | |f7/f6| | 0.64 |
| TD/EPD | 1.66 | f/f3 | 0.89 |
| TL/ImgH | 1.50 | Yc61/Yc62 | 0.76 |
| |f/R9| + |f/R10| | 2.05 | |Sag72|/CT7 | 1.69 |
| |f/R11| + |f/R12| | 5.38 | | |

In the optical photographing lens assembly according to the 4th embodiment, the optical photographing lens assembly includes two adjacent lens elements having Abbe numbers less than 30, i.e., the two adjacent lens elements are the fourth lens element 440 (Abbe number=19.5) and the fifth lens element 450 (Abbe number=28.2).

5th Embodiment

Figure 9:
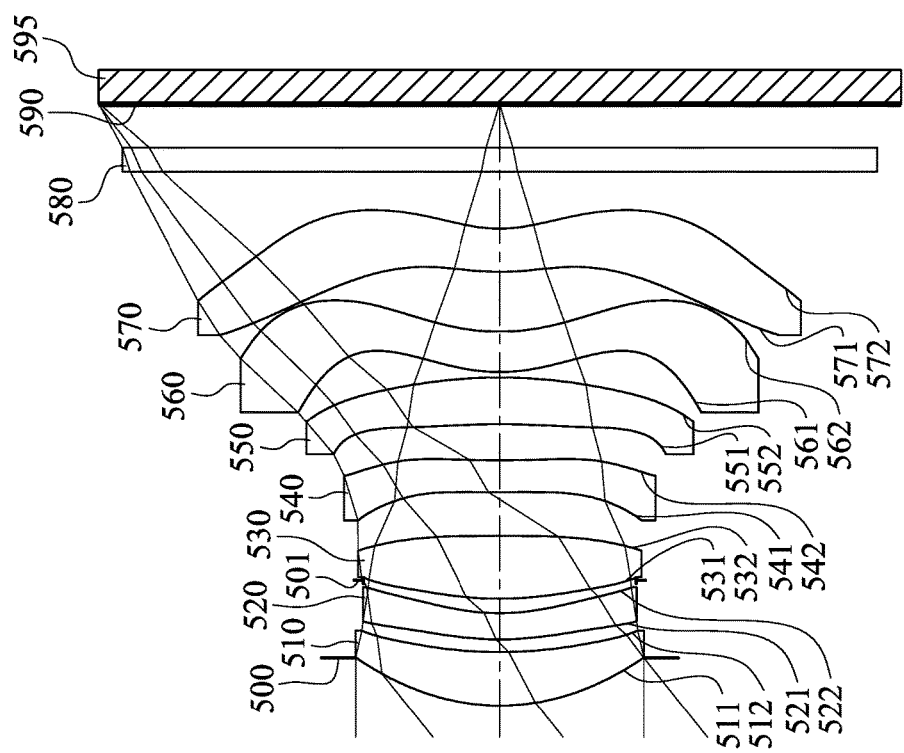
FIG. 9 is a schematic view of an imaging apparatus according to the 5th embodiment of the present disclosure.
Figure 10:
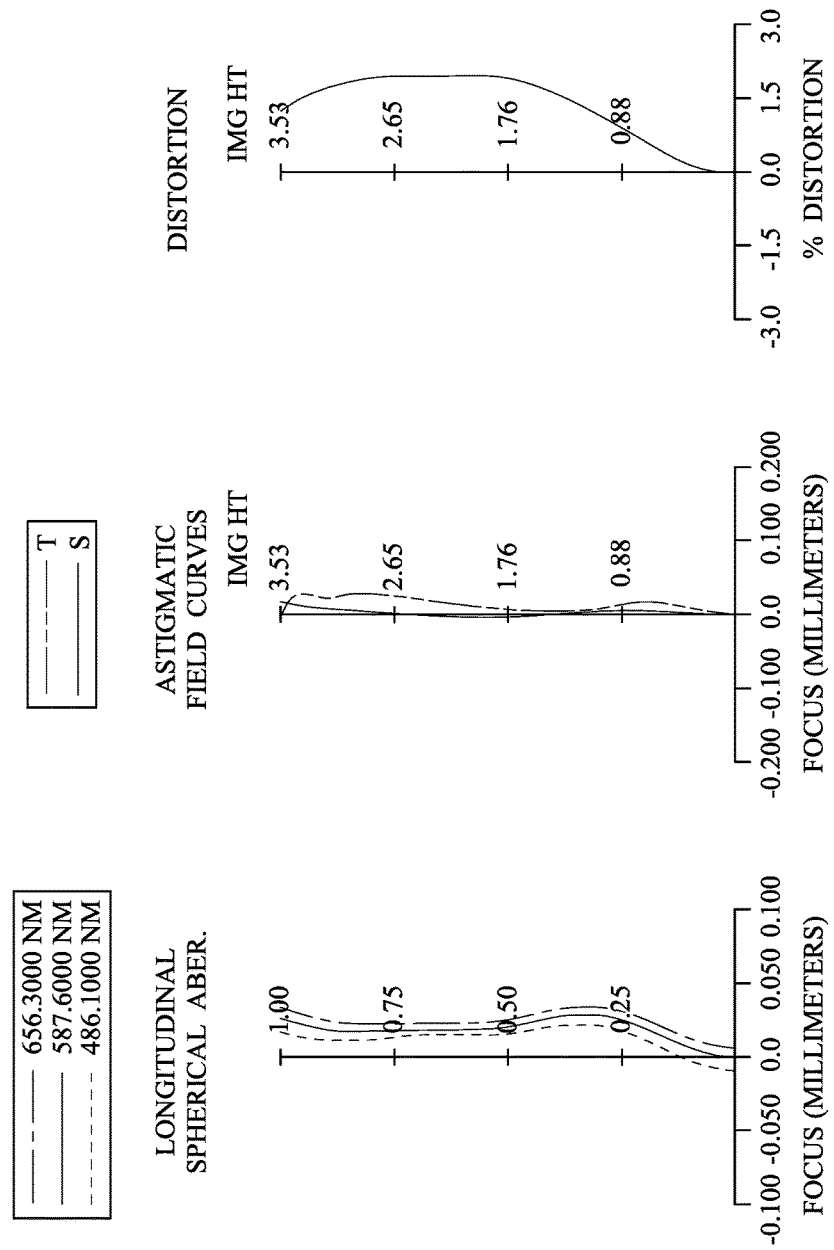
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an optical photographing lens assembly (its reference numeral is omitted) and an image sensor 595. The optical photographing lens assembly includes, in order from an object side to an image side, an aperture stop 500, a first lens element 510, a second lens element 520, a stop 501, a third lens element 530, a fourth lens element 540, a fifth lens element 550, a sixth lens element 560, a seventh lens element 570, an IR-cut filter 580 and an image surface 590. The image sensor 595 is disposed on the image surface 590 of the optical photographing lens assembly. The optical photographing lens assembly includes seven lens elements (510, 520, 530, 540, 550, 560 and 570) without additional one or more lens elements inserted between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Moreover, the image-side surface 542 of the fourth lens element 540 includes at least one convex shape in an off-axis region thereof.

The fifth lens element 550 with negative refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Moreover, the object-side surface 561 of the sixth lens element 560 includes at least one concave shape in an off-axis region thereof, and the image-side surface 562 of the sixth lens element 560 includes at least one convex shape in an off-axis region thereof.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Moreover, the image-side surface 572 of the seventh lens element 570 includes at least one convex shape in an off-axis region thereof.

The IR-cut filter 580 is made of a glass material and located between the seventh lens element 570 and the image surface 590, and will not affect the focal length of the optical photographing lens assembly.

The detailed optical data of the 5th embodiment are shown in TABLE 9 and the aspheric surface data are shown in TABLE 10 below.

TABLE 9

5th Embodiment
f = 4.36 mm, Fno = 1.72, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.420 | | | | |
| 2 | Lens 1 | 2.009 | ASP | 0.471 | Plastic | 1.545 | 66.1 | 7.05 |
| 3 | | 3.863 | ASP | 0.112 | | | | |
| 4 | Lens 2 | 2.698 | ASP | 0.230 | Plastic | 1.669 | 19.5 | −11.36 |
| 5 | | 1.923 | ASP | 0.288 | | | | |
| 6 | Stop | Plano | | −0.160 | | | | |
| 7 | Lens 3 | 3.184 | ASP | 0.561 | Plastic | 1.545 | 56.1 | 5.40 |
| 8 | | −36.235 | ASP | 0.383 | | | | |
| 9 | Lens 4 | 14.323 | ASP | 0.280 | Plastic | 1.669 | 19.5 | −21.23 |
| 10 | | 7.075 | ASP | 0.319 | | | | |
| 11 | Lens 5 | −5.523 | ASP | 0.413 | Plastic | 1.584 | 28.2 | −89.23 |
| 12 | | −6.348 | ASP | 0.050 | | | | |
| 13 | Lens 6 | 1.552 | ASP | 0.355 | Plastic | 1.544 | 56.0 | 9.74 |
| 14 | | 2.017 | ASP | 0.524 | | | | |
| 15 | Lens 7 | 2.090 | ASP | 0.380 | Plastic | 1.544 | 56.0 | −6.34 |
| 16 | | 1.218 | ASP | 0.500 | | | | |
| 17 | IR-cut filter | Plano | | 0.210 | Glass | 1.517 | 64.2 | — |
| 18 | | Plano | | 0.388 | | | | |
| 19 | Image | Plano | | — | | | | |

Reference wavelength is 587.6 nm (d-line).
The effective radius of the surface 6 is 1.200 mm.

TABLE 10

Aspheric Coefficients

| Surface # | 2 | 3 | 4 | 5 | 7 | 8 | 9 |
|---|---|---|---|---|---|---|---|
| k= | −6.7959E−01 | 6.6325E+00 | −2.8217E−01 | −3.1811E+00 | 0.0000E+00 | −9.0000E+01 | −9.0000E+01 |
| A4= | 9.2980E−03 | −2.3110E−02 | −9.9466E−02 | −6.5370E−02 | −3.8364E−02 | −5.6510E−02 | −1.3894E−01 |
| A6= | −1.8777E−04 | 5.9058E−03 | 8.1298E−02 | 2.9121E−02 | 7.5613E−03 | −6.9126E−04 | −3.5595E−02 |

TABLE 10-continued

Aspheric Coefficients

| A8= | 4.3845E−03 | −1.9133E−02 | −1.3672E−01 | 1.3449E−02 | 3.4475E−02 | 1.1505E−02 | 5.2168E−03 |
|---|---|---|---|---|---|---|---|
| A10= | −1.4693E−02 | −2.2787E−02 | 9.4957E−02 | −2.1367E−01 | −2.1712E−01 | −2.1413E−02 | 6.1892E−02 |
| A12= | 1.0719E−02 | 4.1457E−02 | 8.3174E−03 | 3.4855E−01 | 3.1024E−01 | 2.4119E−02 | −2.1434E−02 |
| A14= | −2.4823E−03 | −1.3971E−02 | −2.6539E−02 | −2.0457E−01 | −1.6435E−01 | −8.6921E−03 | −1.4562E−02 |
| A16= | | | 5.9110E−03 | 4.0609E−02 | 2.9586E02 | 2.0450E−04 | 5.9982E−03 |

| Surface # | 10 | 11 | 12 | 13 | 14 | 15 | 16 |
|---|---|---|---|---|---|---|---|
| k= | −9.0000E+01 | −9.0000E+01 | −6.7221E+01 | −6.5978E+00 | −1.2547E+00 | −8.7980E+00 | −5.7182E+00 |
| A4= | −4.7679E−02 | 4.2946E−02 | −1.6322E−01 | 5.8696E−03 | 2.5870E−02 | −3.2864E−01 | −1.9099E−01 |
| A6= | −9.4826E−02 | 4.8417E−02 | 2.4281E−01 | −6.3371E−02 | −1.1160E−01 | 2.5799E−01 | 1.3192E−01 |
| A8= | 1.0212E−01 | −1.4310E−01 | −1.8846E−01 | 7.3014E−03 | 6.6840E−02 | −1.4310E−01 | −7.0367E−02 |
| A10= | −9.7740E−02 | 1.1992E−01 | 7.6895E−02 | 8.4724E−03 | −2.2276E−02 | 5.7511E−02 | 2.6106E−02 |
| A12= | 9.6781E−02 | −6.0203E−02 | −1.6028E−02 | −5.0010E−03 | 4.4434E−03 | −1.6116E−02 | −6.6923E−03 |
| A14= | −5.1280E−02 | 1.8998E−02 | 1.3157E−03 | 1.0973E−03 | −5.0112E−04 | 3.0215E−03 | 1.1473E−03 |
| A16= | 1.0133E−02 | −3.0411E−03 | 2.3872E−06 | −8.2221E−05 | 2.4404E−05 | −3.5806E−04 | −1.2301E−04 |
| A18= | | | | | | 2.4122E−05 | 7.3510E−06 |
| A20= | | | | | | −7.0167E−07 | −1.8528E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 4.36 | |f3/f1| | 0.77 |
| Fno | 1.72 | |f3/f2| | 0.48 |
| HFOV (deg.) | 38.5 | |f3/f4| | 0.25 |
| FOV (deg.) | 77.00 | |f3/f5| | 0.06 |
| Nmax | 1.669 | |f3/f6| | 0.55 |
| V20 | 2 | |f3/f7| | 0.85 |
| V30 | 3 | |f7/f1| | 0.90 |
| R8/|R7| | 0.49 | |f7/f2| | 0.56 |
| f/R13 | 2.09 | |f7/f4| | 0.30 |
| CT3/CT1 | 1.17 | |f7/f5| | 0.07 |
| T34/T45 | 1.20 | |f7/f6| | 0.65 |
| TD/EPD | 1.66 | f/f3 | 0.81 |
| TL/ImgH | 1.50 | Yc61/Yc62 | 0.75 |
| |f/R9| + |f/R10| | 1.48 | |Sag72|/CT7 | 1.67 |
| |f/R11| + |f/R12| | 4.97 | | |

In the optical photographing lens assembly according to the 5th embodiment, the optical photographing lens assembly includes two adjacent lens elements having Abbe numbers less than 30, i.e., the two adjacent lens elements are the fourth lens element 540 (Abbe number=19.5) and the fifth lens element 550 (Abbe number=28.2).

6th Embodiment

Figure 11:
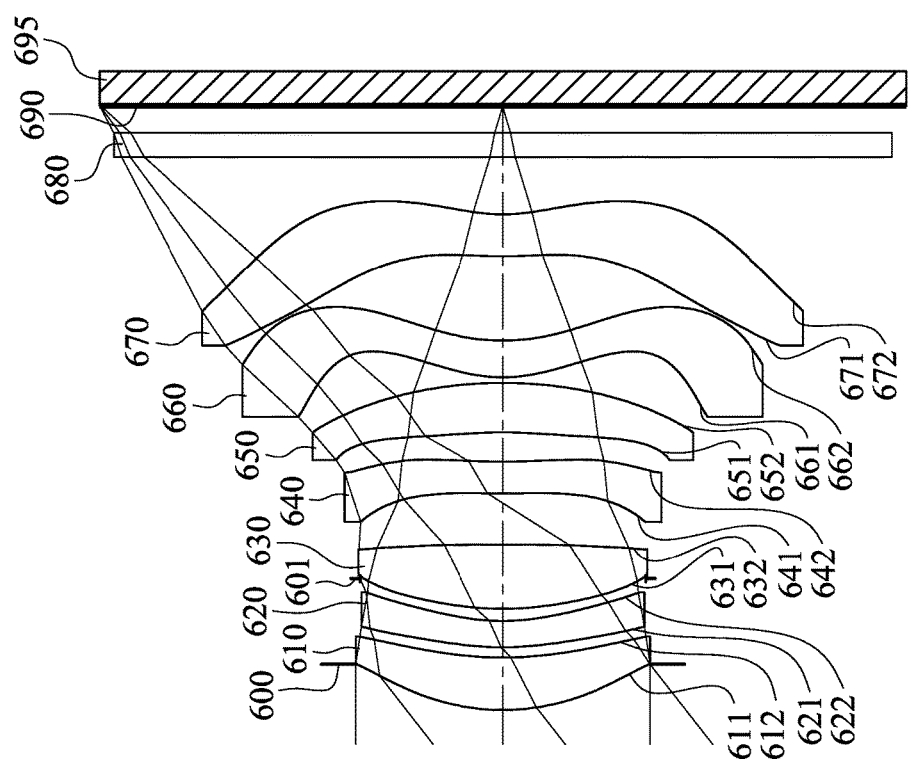
FIG. 11 is a schematic view of an imaging apparatus according to the 6th embodiment of the present disclosure.
Figure 12:
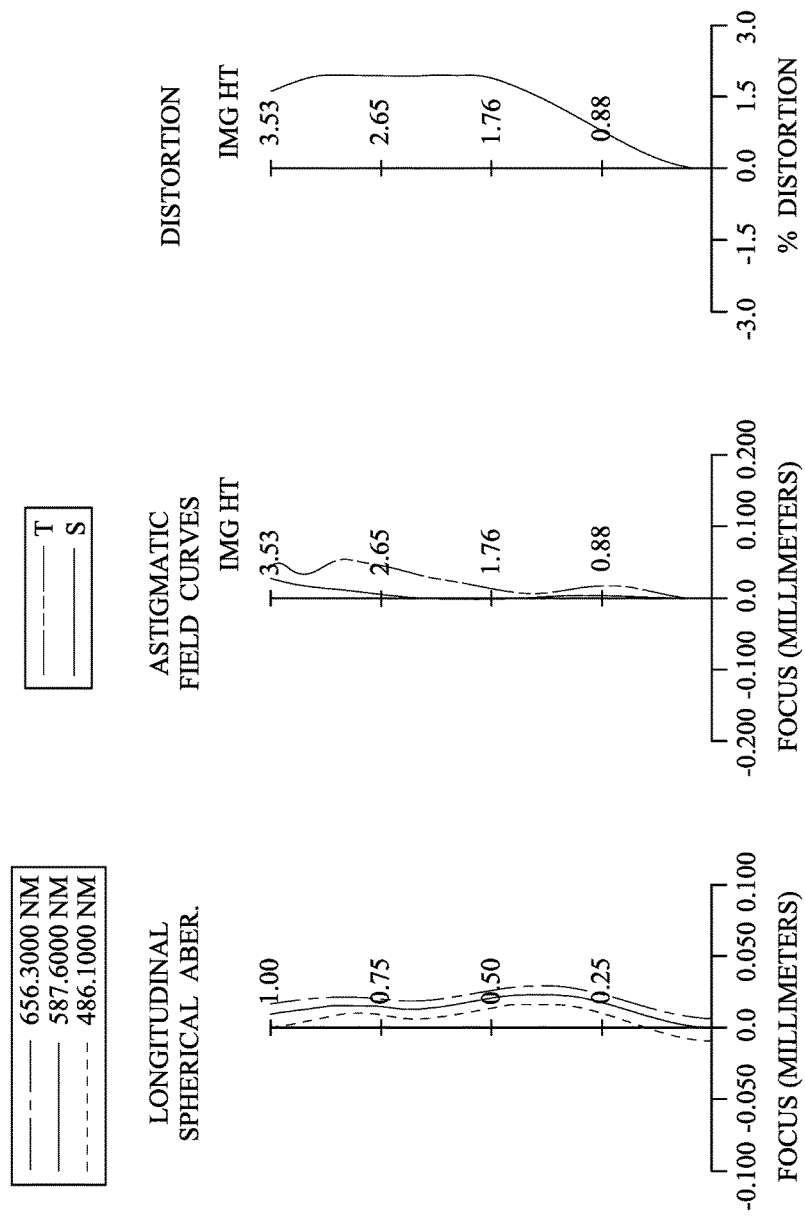
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an optical photographing lens assembly (its reference numeral is omitted) and an image sensor 695. The optical photographing lens assembly includes, in order from an object side to an image side, an aperture stop 600, a first lens element 610, a second lens element 620, a stop 601, a third lens element 630, a fourth lens element 640, a fifth lens element 650, a sixth lens element 660, a seventh lens element 670, an IR-cut filter 680 and an image surface 690. The image sensor 695 is disposed on the image surface 690 of the optical photographing lens assembly. The optical photographing lens assembly includes seven lens elements (610, 620, 630, 640, 650, 660 and 670) without additional one or more lens elements inserted between the first lens element 610 and the seventh lens element 670.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Moreover, the image-side surface 642 of the fourth lens element 640 includes at least one convex shape in an off-axis region thereof.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Moreover, the object-side surface 661 of the sixth lens element 660 includes at least one concave shape in an off-axis region thereof, and the image-side surface 662 of the sixth lens element 660 includes at least one convex shape in an off-axis region thereof.

The seventh lens element 670 with negative refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Moreover, the image-side surface 672 of the seventh lens element 670 includes at least one convex shape in an off-axis region thereof.

The IR-cut filter 680 is made of a glass material and located between the seventh lens element 670 and the image surface 690, and will not affect the focal length of the optical photographing lens assembly.

The detailed optical data of the 6th embodiment are shown in TABLE 11 and the aspheric surface data are shown in TABLE 12 below.

TABLE 11

6th Embodiment
f = 4.43 mm, Fno = 1.72, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 1.990 | ASP | 0.460 | Plastic | 1.545 | 56.0 | 8.00 |
| 3 | | 3.364 | ASP | 0.088 | | | | |
| 4 | Lens 2 | 2.546 | ASP | 0.230 | Plastic | 1.669 | 19.5 | −11.71 |
| 5 | | 1.852 | ASP | 0.371 | | | | |
| 6 | Stop | Plano | | −0.264 | | | | |
| 7 | Lens 3 | 2.720 | ASP | 0.565 | Plastic | 1.545 | 56.0 | 4.93 |
| 8 | | −180.797 | ASP | 0.448 | | | | |
| 9 | Lens 4 | 17.629 | ASP | 0.280 | Plastic | 1.669 | 19.5 | −20.70 |
| 10 | | 7.706 | ASP | 0.255 | | | | |
| 11 | Lens 5 | −3.920 | ASP | 0.432 | Plastic | 1.584 | 28.2 | −35.16 |
| 12 | | −5.042 | ASP | 0.050 | | | | |
| 13 | Lens 6 | 1.364 | ASP | 0.320 | Plastic | 1.544 | 56.0 | 7.41 |
| 14 | | 1.892 | ASP | 0.742 | | | | |
| 15 | Lens 7 | 3.987 | ASP | 0.368 | Plastic | 1.544 | 56.0 | −4.95 |
| 16 | | 1.555 | ASP | 0.500 | | | | |
| 17 | IR-cut filter | Plano | | 0.210 | Glass | 1.517 | 64.2 | — |
| 18 | | Plano | | 0.238 | | | | |
| 19 | Image | Plano | | — | | | | |

Reference wavelength is 587.6 nm (d-line).
The effective radius of the surface 6 is 1.250 mm.

TABLE 12

Aspheric Coefficients

| Surface # | 2 | 3 | 4 | 5 | 7 | 8 | 9 |
|---|---|---|---|---|---|---|---|
| k= | −8.4184E−01 | 8.9591E−01 | −1.0000E+00 | −5.3239E+00 | 0.0000E+00 | −1.0000E+00 | −1.0000E+00 |
| A4= | 8.5290E−03 | −6.6499E−02 | −1.7397E−01 | −1.1355E−01 | −8.1037E−02 | −2.3756E−02 | −1.1018E−01 |
| A6= | 3.0822E−03 | 1.5666E−01 | 3.0173E−01 | 2.9503E−01 | 1.6539E−01 | −3.0799E−02 | −4.3332E−02 |
| A8= | −5.8328E−03 | −2.2321E−01 | −4.0649E−01 | −5.1536E−01 | −2.9099E−01 | 9.8035E−02 | −2.6545E−02 |
| A10= | −1.0635E−03 | 1.3726E−01 | 2.9658E−01 | 4.8717E−01 | 2.8662E−01 | −1.4259E−01 | 1.4017E−01 |
| A12= | | −3.1117E−02 | −9.7678E−02 | −2.1988E−01 | −1.3004E−01 | 1.1910E−01 | −1.2584E−01 |
| A14= | | | 1.0232E−02 | 3.6955E−02 | 2.2219E−02 | −5.0155E−02 | 4.8970E−02 |
| A16= | | | | | | 8.1606E−03 | −8.2650E−03 |

| Surface # | 10 | 11 | 12 | 13 | 14 | 15 | 16 |
|---|---|---|---|---|---|---|---|
| k= | −9.4459E−16 | −8.3364E+01 | −2.8494E+01 | −6.1083E+00 | −2.0066E+00 | −2.2812E+00 | −7.7530E+00 |
| A4= | −2.5922E−02 | 4.5165E−02 | −1.3864E−01 | 2.6042E−02 | 4.5147E−02 | −3.5490E−01 | −1.8796E−01 |
| A6= | −1.4732E−01 | −2.5259E−02 | 1.3592E−01 | −9.0499E−02 | −1.3461E−01 | 2.7175E−01 | 1.4095E−01 |
| A8= | 2.0621E−01 | 1.1089E−02 | −5.4259E−02 | 3.4432E−02 | 8.7064E−02 | −1.5124E−01 | −8.1587E−02 |
| A10= | −2.1865E−01 | −4.1368E−02 | −9.0894E−03 | −5.3797E−03 | −3.1879E−02 | 5.7311E−02 | 3.2594E−02 |
| A12= | 1.6767E−01 | 3.6508E−02 | 1.4205E−02 | −2.1895E−05 | 6.9061E−03 | −1.3733E−02 | −8.8813E−03 |
| A14= | −7.0767E−02 | −1.2203E−02 | −4.1213E−03 | −3.9740E−04 | −8.2187E−04 | 1.9775E−03 | 1.5860E−03 |
| A16= | 1.2049E−02 | 1.2328E−03 | 3.8669E−04 | 1.2438E−04 | 4.1011E−05 | −1.5666E−04 | −1.7422E−04 |
| A18= | | | | | | 5.3494E−06 | 1.0563E−05 |
| A20= | | | | | | −1.0876E−08 | −2.6883E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 4.43 | \|f3/f1\| | 0.62 |
| Fno | 1.72 | \|f3/f2\| | 0.42 |
| HFOV (deg.) | 38.0 | \|f3/f4\| | 0.24 |
| FOV (deg.) | 76.00 | \|f3/f5\| | 0.14 |
| Nmax | 1.669 | \|f3/f6\| | 0.66 |
| V20 | 2 | \|f3/f7\| | 0.99 |
| V30 | 3 | \|f7/f1\| | 0.62 |
| R8/\|R7\| | 0.44 | \|f7/f2\| | 0.42 |
| f/R13 | 1.11 | \|f7/f4\| | 0.24 |
| CT3/CT1 | 1.23 | \|f7/f5\| | 0.14 |
| T34/T45 | 1.76 | \|f7/f6\| | 0.67 |
| TD/EPD | 1.69 | f/f3 | 0.90 |
| TL/ImgH | 1.50 | Yc61/Yc62 | 0.78 |
| \|f/R9\| + \|f/R10\| | 2.01 | \|Sag72\|/CT7 | 2.32 |
| \|f/R11\| + \|f/R12\| | 5.59 | | |

In the optical photographing lens assembly according to the 6th embodiment, the optical photographing lens assembly includes two adjacent lens elements having Abbe numbers less than 30, i.e., the two adjacent lens elements are the fourth lens element 640 (Abbe number=19.5) and the fifth lens element 650 (Abbe number=28.2).

7th Embodiment

Figure 13:
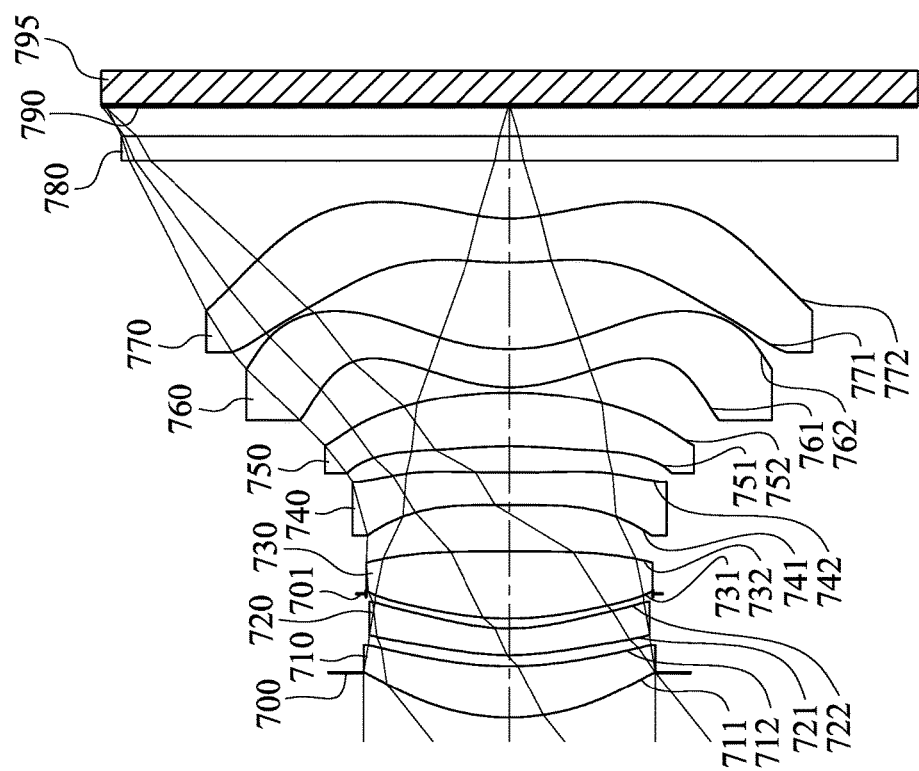
FIG. 13 is a schematic view of an imaging apparatus according to the 7th embodiment of the present disclosure.
Figure 14:
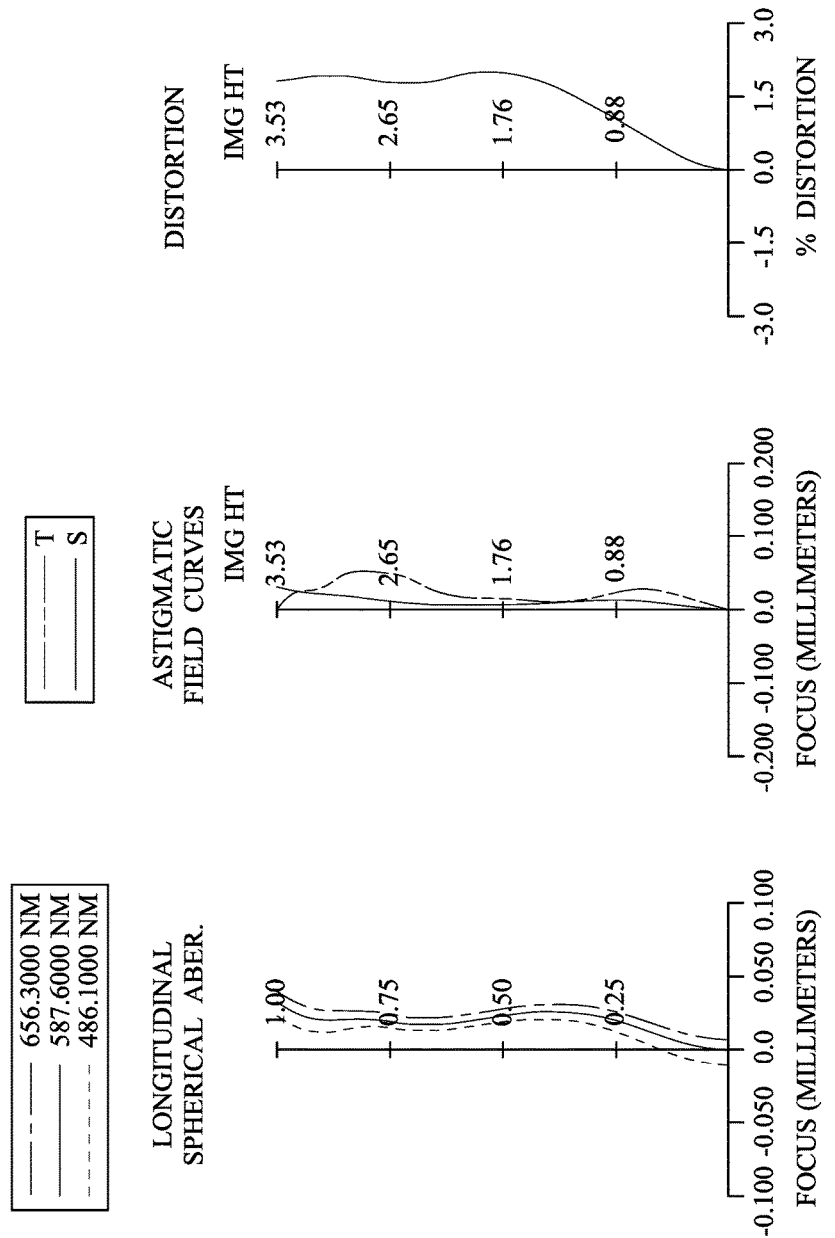
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an optical photographing lens assembly (its reference numeral is omitted) and an image sensor 795. The optical photographing lens assembly includes, in order from an object side to an image side, an aperture stop 700, a first lens element 710, a second lens element 720, a stop 701, a third lens element 730, a fourth lens element 740, a fifth lens element 750, a sixth lens element 760, a seventh lens element 770, an IR-cut filter 780 and an image surface 790. The image sensor 795 is disposed on the image surface 790 of the optical photographing lens assembly. The optical photographing lens assembly includes seven lens elements (710, 720, 730, 740, 750, 760 and 770) without additional one or more lens elements inserted between the first lens element 710 and the seventh lens element 770.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric. Moreover, the image-side surface 742 of the fourth lens element 740 includes at least one convex shape in an off-axis region thereof.

The fifth lens element 750 with negative refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Moreover, the object-side surface 761 of the sixth lens element 760 includes at least one concave shape in an off-axis region thereof, and the image-side surface 762 of the sixth lens element 760 includes at least one convex shape in an off-axis region thereof.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Moreover, the image-side surface 772 of the seventh lens element 770 includes at least one convex shape in an off-axis region thereof.

The IR-cut filter 780 is made of a glass material and located between the seventh lens element 770 and the image surface 790, and will not affect the focal length of the optical photographing lens assembly.

The detailed optical data of the 7th embodiment are shown in TABLE 13 and the aspheric surface data are shown in TABLE 14 below.

TABLE 13

7th Embodiment
f = 4.34 mm, Fno = 1.72, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.392 | | | | |
| 2 | Lens 1 | 1.984 | ASP | 0.446 | Plastic | 1.545 | 56.1 | 8.95 |
| 3 | | 3.080 | ASP | 0.097 | | | | |
| 4 | Lens 2 | 2.369 | ASP | 0.230 | Plastic | 1.669 | 19.5 | −13.52 |
| 5 | | 1.804 | ASP | 0.300 | | | | |
| 6 | Stop | Plano | | −0.214 | | | | |
| 7 | Lens 3 | 2.702 | ASP | 0.580 | Plastic | 1.545 | 56.1 | 4.69 |
| 8 | | −43.564 | ASP | 0.400 | | | | |
| 9 | Lens 4 | −56.100 | ASP | 0.280 | Plastic | 1.669 | 19.5 | −16.37 |
| 10 | | 13.634 | ASP | 0.227 | | | | |
| 11 | Lens 5 | −3.872 | ASP | 0.465 | Plastic | 1.584 | 28.2 | −62.83 |
| 12 | | −4.520 | ASP | 0.049 | | | | |
| 13 | Lens 6 | 1.376 | ASP | 0.330 | Plastic | 1.544 | 56.0 | 7.72 |
| 14 | | 1.872 | ASP | 0.746 | | | | |
| 15 | Lens 7 | 3.094 | ASP | 0.380 | Plastic | 1.544 | 56.0 | −5.31 |
| 16 | | 1.429 | ASP | 0.500 | | | | |
| 17 | IR-cut filter | Plano | | 0.210 | Glass | 1.517 | 64.2 | — |
| 18 | | Plano | | 0.267 | | | | |
| 19 | Image | Plano | | — | | | | |

Reference wavelength is 587.6 nm (d-line)
The effective radius of the surface 6 is 1.240 mm.
The effective radius of the surface 13 is 1.810 mm.

TABLE 14

Aspheric Coefficients

| Surface # | 2 | 3 | 4 | 5 | 7 | 8 | 9 |
|---|---|---|---|---|---|---|---|
| k= | −1.1478E+00 | 2.0957E+00 | −1.0000E+00 | −6.0265E+00 | 0.0000E+00 | −1.0000E+00 | −6.3885E+01 |
| A4= | 1.2430E−02 | −8.3251E−02 | −1.7970E−01 | −8.2367E−02 | −7.0206E−02 | −3.2411E−02 | −1.0844E−01 |
| A6= | 6.8056E−03 | 1.5301E−01 | 2.7411E−01 | 2.1921E−01 | 1.3960E−01 | −1.2863E−02 | −6.5821E−02 |
| A8= | −1.0037E−02 | −2.2798E−01 | −3.8794E−01 | −4.6663E−01 | −3.1456E−01 | 1.4607E−02 | −1.4465E−02 |
| A10= | 5.9223E−04 | 1.4508E−01 | 3.0326E−01 | 4.7409E−01 | 3.1678E−01 | −1.3908E−02 | 1.7526E−01 |
| A12= | | −3.2987E−02 | −1.0542E−01 | −2.1414E−01 | −1.3668E−01 | 9.6822E−03 | −1.7042E−01 |
| A14= | | | 1.1751E−02 | 3.4759E−02 | 2.1598E−02 | −2.1195E−03 | 7.2082E−02 |
| A16= | | | | | | −1.4669E−04 | −1.2908E−02 |

| Surface # | 10 | 11 | 12 | 13 | 14 | 15 | 16 |
|---|---|---|---|---|---|---|---|
| k= | 1.6597E−15 | −4.1371E+01 | −1.8945E+01 | −6.1327E+00 | −1.7990E+00 | −3.9894E+00 | −5.4651E+00 |
| A4= | −2.9264E−03 | 1.1168E−01 | −1.2316E−01 | 6.1926E−02 | 6.2873E−02 | −3.2692E−01 | −2.0154E−01 |
| A6= | −1.7170E−01 | −1.3646E−01 | 1.2316E−01 | −1.2582E−01 | −1.4973E−01 | 2.2478E−01 | 1.5507E−01 |
| A8= | 2.0549E−01 | 1.1398E−01 | −6.1193E−02 | 6.0342E−02 | 9.4719E−02 | −1.1344E−01 | −9.4599E−02 |
| A10= | −1.8709E−01 | −1.1652E−01 | 8.0798E−04 | −1.7882E−02 | −3.4673E−02 | 3.8849E−02 | 4.0247E−02 |
| A12= | 1.4245E−01 | 7.5780E−02 | 9.2014E−03 | 3.2936E−03 | 7.5965E−03 | −7.9543E−03 | −1.1631E−02 |
| A14= | −6.2108E−02 | −2.4765E−02 | −3.1859E−03 | −7.7307E−04 | −9.2127E−04 | 8.2717E−04 | 2.1858E−03 |
| A16= | 1.0885E−02 | 3.0155E−03 | 3.9274E−04 | 1.3190E−04 | 4.7033E−05 | −1.9303E−05 | −2.5137E−04 |
| A18= | | | | | | −3.3386E−06 | 1.5917E−05 |
| A20= | | | | | | 2.0290E−07 | −4.2254E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

7th Embodiment

| | | | |
|---|---|---|---|
| f (mm) | 4.34 | |f3/f1| | 0.52 |
| Fno | 1.72 | |f3/f2| | 0.35 |
| HFOV (deg.) | 38.5 | |f3/f4| | 0.29 |
| FOV (deg.) | 77.00 | |f3/f5| | 0.07 |
| Nmax | 1.669 | |f3/f6| | 0.61 |
| V20 | 2 | |f3/f7| | 0.88 |
| V30 | 3 | |f7/f1| | 0.59 |
| R8/|R7| | 0.24 | |f7/f2| | 0.39 |
| f/R13 | 1.40 | |f7/f4| | 0.32 |
| CT3/CT1 | 1.30 | |f7/f5| | 0.08 |
| T34/T45 | 1.76 | |f7/f6| | 0.69 |
| TD/EPD | 1.71 | f/f3 | 0.93 |
| TL/ImgH | 1.50 | Yc61/Yc62 | 0.78 |

-continued

| 7th Embodiment | | | |
|---|---|---|---|
| \|f/R9\| + \|f/R10\| | 2.08 | \|Sag72\|/CT7 | 2.09 |
| \|f/R11\| + \|f/R12\| | 5.47 | | |

In the optical photographing lens assembly according to the 7th embodiment, the optical photographing lens assembly includes two adjacent lens elements having Abbe numbers less than 30, i.e., the two adjacent lens elements are the fourth lens element 740 (Abbe number=19.5) and the fifth lens element 750 (Abbe number=28.2).

8th Embodiment

Figure 15:
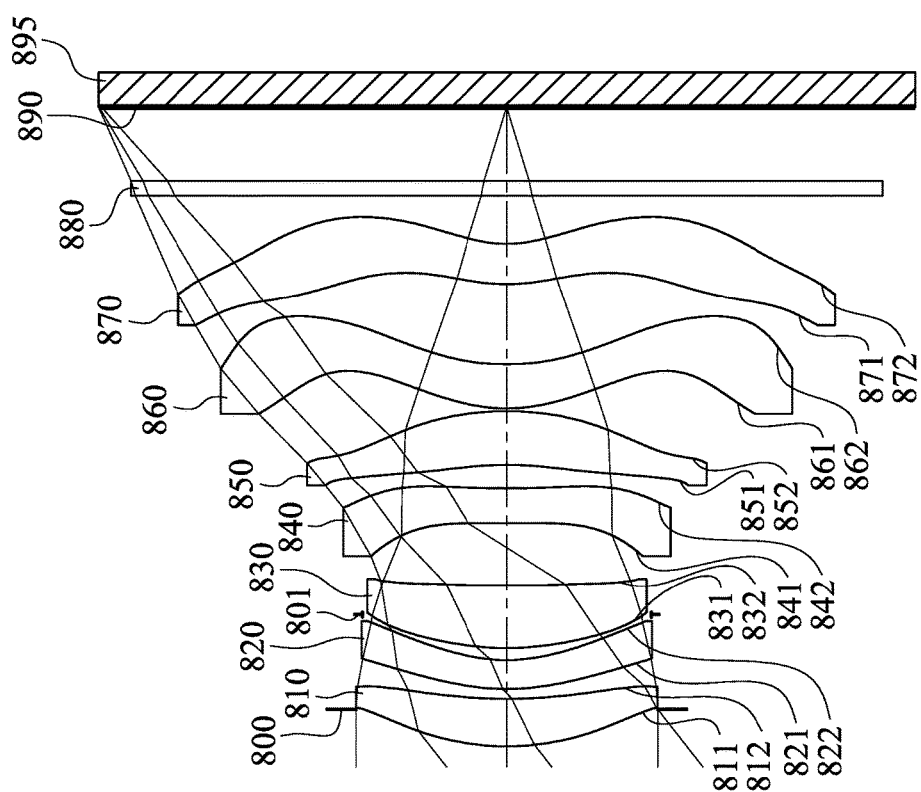
FIG. 15 is a schematic view of an imaging apparatus according to the 8th embodiment of the present disclosure.
Figure 16:
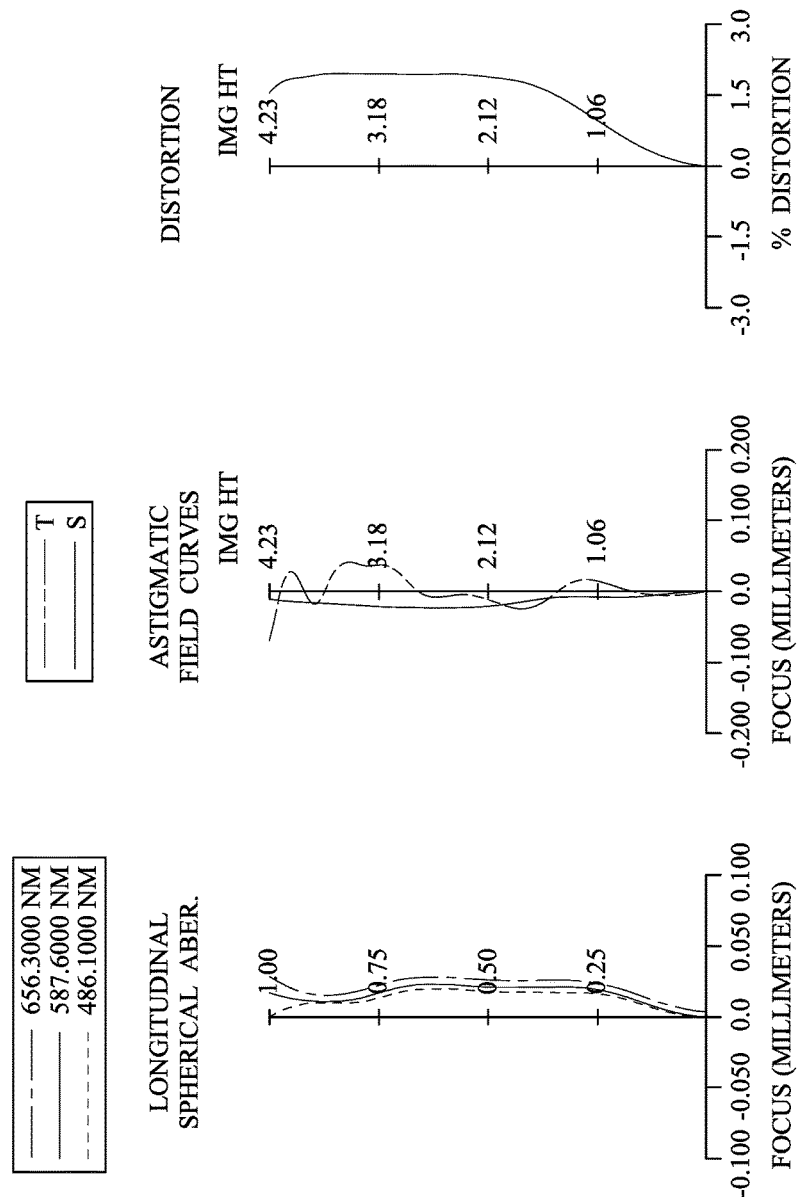
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an optical photographing lens assembly (its reference numeral is omitted) and an image sensor 895. The optical photographing lens assembly includes, in order from an object side to an image side, an aperture stop 800, a first lens element 810, a second lens element 820, a stop 801, a third lens element 830, a fourth lens element 840, a fifth lens element 850, a sixth lens element 860, a seventh lens element 870, an IR-cut filter 880 and an image surface 890. The image sensor 895 is disposed on the image surface 890 of the optical photographing lens assembly. The optical photographing lens assembly includes seven lens elements (810, 820, 830, 840, 850, 860 and 870) without additional one or more lens elements inserted between the first lens element 810 and the seventh lens element 870.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Moreover, the image-side surface 842 of the fourth lens element 840 includes at least one convex shape in an off-axis region thereof.

The fifth lens element 850 with negative refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Moreover, the object-side surface 861 of the sixth lens element 860 includes at least one concave shape in an off-axis region thereof, and the image-side surface 862 of the sixth lens element 860 includes at least one convex shape in an off-axis region thereof.

The seventh lens element 870 with negative refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Moreover, the image-side surface 872 of the seventh lens element 870 includes at least one convex shape in an off-axis region thereof.

The IR-cut filter 880 is made of a glass material and located between the seventh lens element 870 and the image surface 890, and will not affect the focal length of the optical photographing lens assembly.

The detailed optical data of the 8th embodiment are shown in TABLE 15 and the aspheric surface data are shown in TABLE 16 below.

TABLE 15

8th Embodiment
f = 5.32 mm, Fno = 1.70, HFOV = 38.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.385 | | | | |
| 2 | Lens 1 | 2.719 ASP | 0.493 | Plastic | 1.545 | 56.0 | 8.67 |
| 3 | | 6.005 ASP | 0.101 | | | | |
| 4 | Lens 2 | 2.547 ASP | 0.300 | Plastic | 1.669 | 19.5 | −11.95 |
| 5 | | 1.840 ASP | 0.473 | | | | |
| 6 | Stop | Plano | −0.347 | | | | |
| 7 | Lens 3 | 3.150 ASP | 0.653 | Plastic | 1.544 | 56.0 | 7.01 |
| 8 | | 16.754 ASP | 0.649 | | | | |
| 9 | Lens 4 | 92.012 ASP | 0.361 | Plastic | 1.669 | 19.5 | −15.02 |
| 10 | | 9.044 ASP | 0.243 | | | | |
| 11 | Lens 5 | −3.351 ASP | 0.555 | Plastic | 1.584 | 28.2 | −81.36 |

TABLE 15-continued

8th Embodiment
f = 5.32 mm, Fno = 1.70, HFOV = 38.0 deg.

| Surface # | | Curvature Radius | Thickness | Material | Index | Abbe # | Focal Length |
|---|---|---|---|---|---|---|---|
| 12 | | −3.825 | ASP | 0.030 | | | |
| 13 | Lens 6 | 1.775 | ASP | 0.459 | Plastic | 1.544 | 56.0 | 7.51 |
| 14 | | 2.852 | ASP | 0.834 | | | |
| 15 | Lens 7 | 1.846 | ASP | 0.420 | Plastic | 1.534 | 55.9 | −10.73 |
| 16 | | 1.286 | ASP | 0.500 | | | |
| 17 | IR-cut filter | Plano | | 0.150 | Glass | 1.517 | 64.2 | — |
| 18 | | Plano | | 0.767 | | | |
| 19 | Image | Plano | | — | | | |

Reference wavelength is 587.6 nm (d-line).
The effective radius of the surface 6 is 1.500 mm.
The effective radius of the surface 10 is 1.700 mm.

TABLE 16

Aspheric Coefficients

| Surface # | 2 | 3 | 4 | 5 | 7 | 8 | 9 |
|---|---|---|---|---|---|---|---|
| k= | −5.7095E−01 | −2.9025E+01 | −1.3508E+01 | −2.0315E+00 | 2.1503E+00 | 4.3105E+01 | 9.0000E+01 |
| A4= | 5.6151E−03 | 4.8912E−02 | 8.6603E−02 | −1.3183E−02 | −1.8411E−02 | −1.5349E−02 | −9.4156E−02 |
| A6= | −9.5306E−04 | −7.3256E−02 | −1.3623E−02 | −3.5194E−02 | 2.7027E−03 | 1.0709E−02 | 4.1076E−02 |
| A8= | −6.0068E−03 | 5.9824E−02 | 1.1513E−01 | 2.8265E−02 | −2.5196E−02 | −1.3616E−02 | −1.1551E−01 |
| A10= | 4.8929E−03 | −2.9065E−02 | −5.4766E−02 | −5.8759E−03 | 2.8568E−02 | 1.4283E−02 | 1.2223E−01 |
| A12= | −2.0864E−03 | 7.0150E−03 | 1.3659E−02 | −6.1963E−04 | −1.0915E−02 | −6.3237E−03 | −6.1543E−02 |
| A14= | 2.8809E−04 | −6.6690E−04 | −1.3806E−03 | 1.8817E−04 | 1.4533E−03 | 1.2287E−03 | 1.5127E−02 |
| A16= | | | | | | | −1.4457E−03 |

| Surface # | 10 | 11 | 12 | 13 | 14 | 15 | 16 |
|---|---|---|---|---|---|---|---|
| k= | −6.4191E+01 | −6.9896E+01 | −6.5692E+01 | −7.1080E−01 | −6.7435E−01 | −1.4839E+00 | −3.4741E+00 |
| A4= | −4.4799E−02 | −1.0959E−01 | −2.1374E−01 | −8.0977E−02 | 6.0446E−02 | −2.1498E−01 | −1.2227E−01 |
| A6= | 5.9584E−02 | 2.7405E−01 | 2.1880E−01 | 5.1990E−02 | −5.5085E−02 | 9.8348E−02 | 5.8218E−02 |
| A8= | −9.2609E−02 | −2.8730E−01 | −1.6430E−01 | −4.5983E−02 | 1.6613E−02 | −3.6737E−02 | −2.1704E−02 |
| A10= | 5.8923E−02 | 1.7320E−01 | 9.2655E−02 | 2.1731E−02 | −2.4590E−03 | 9.8054E−03 | 5.6673E−03 |
| A12= | −1.8224E−02 | −6.8592E−02 | −3.7895E−02 | −6.1245E−03 | 8.1353E−05 | −1.8248E−03 | −9.9938E−04 |
| A14= | 2.5658E−03 | 1.9344E−02 | 1.0860E−02 | 1.0458E−03 | 3.1299E−05 | 2.1967E−04 | 1.1518E−04 |
| A16= | −1.0288E−04 | −3.9472E−03 | −2.0161E−03 | −1.0395E−04 | −5.2153E−06 | −1.6387E−05 | −8.2159E−06 |
| A18= | | 5.2555E−04 | 2.1268E−04 | 5.4143E−06 | 3.2615E−07 | 6.8902E−07 | 3.2667E−07 |
| A20= | | −3.3324E−05 | −9.5796E−06 | −1.1048E−07 | −7.2225E−09 | −1.2474E−08 | −5.5145E−09 | in the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 5.32 | |f3/f1| | 0.81 |
| Fno | 1.70 | |f3/f2| | 0.59 |
| HFOV (deg.) | 38.0 | |f3/f4| | 0.47 |
| FOV (deg.) | 76.00 | |f3/f5| | 0.09 |
| Nmax | 1.669 | |f3/f6| | 0.93 |
| V20 | 2 | |f3/f7| | 0.65 |
| V30 | 3 | |f7/f1| | 1.24 |
| R8/|R7| | 0.10 | |f7/f2| | 0.90 |
| f/R13 | 2.88 | |f7/f4| | 0.71 |
| CT3/CT1 | 1.32 | |f7/f5| | 0.13 |
| T34/T45 | 2.67 | |f7/f6| | 1.43 |
| TD/EPD | 1.67 | f/f3 | 0.76 |
| TL/ImgH | 1.57 | Yc61/Yc62 | 0.76 |
| |f/R9| + |f/R10| | 2.98 | |Sag72|/CT7 | 0.91 |
| |f/R11| + |f/R12| | 4.86 | | |

In the optical photographing lens assembly according to the 8th embodiment, the optical photographing lens assembly includes two adjacent lens elements having Abbe numbers less than 30, i.e., the two adjacent lens elements are the fourth lens element 840 (Abbe number=19.5) and the fifth lens element 850 (Abbe number=28.2).

9th Embodiment

Figure 17:
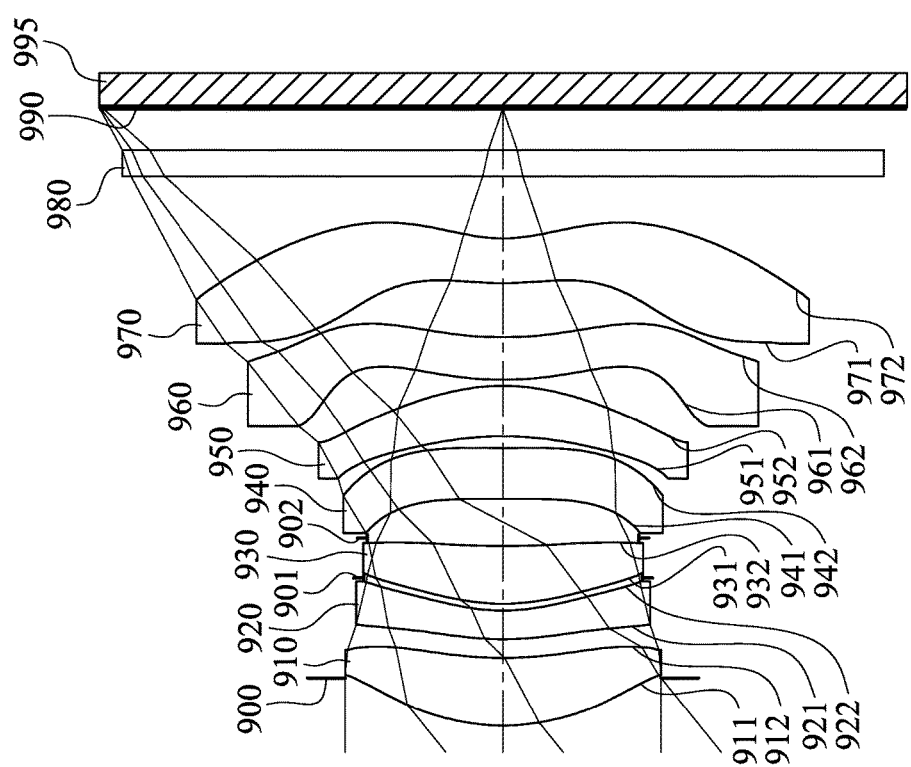
FIG. 17 is a schematic view of an imaging apparatus according to the 9th embodiment of the present disclosure.
Figure 18:
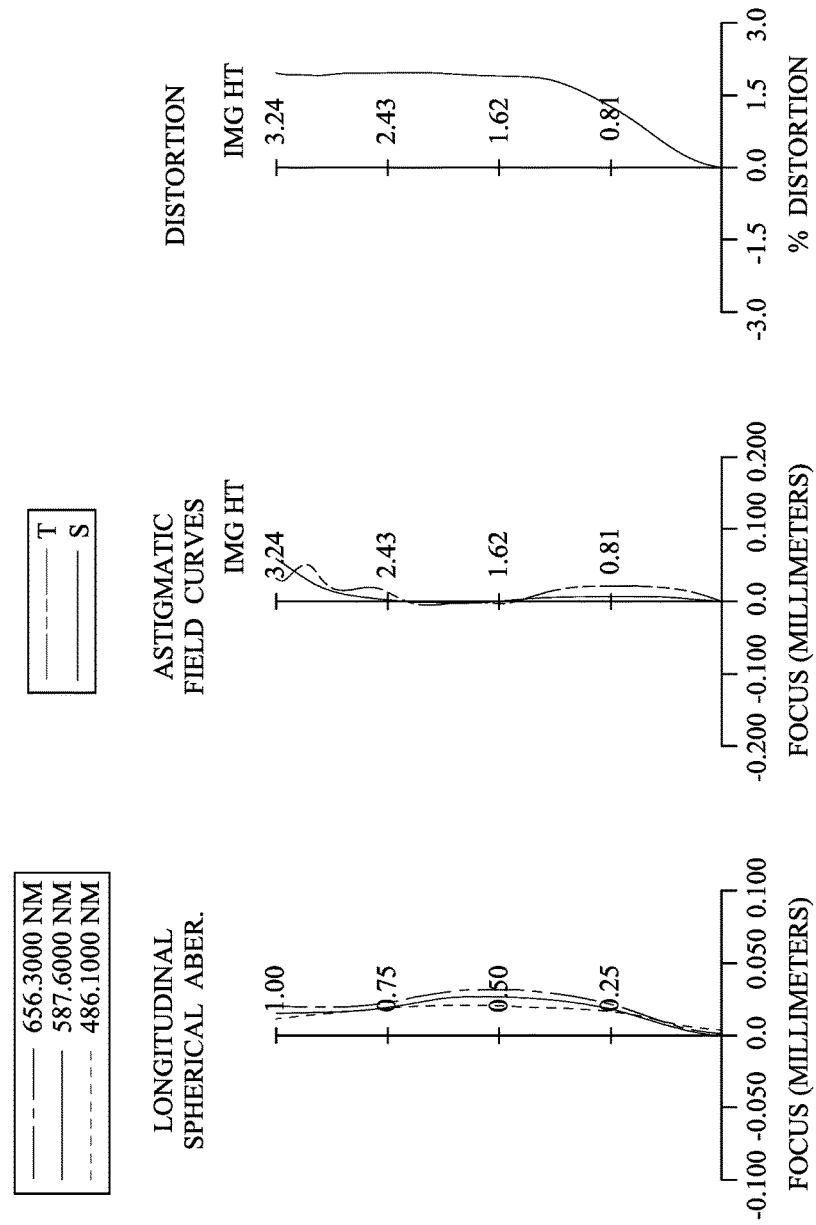
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an optical photographing lens assembly (its reference numeral is omitted) and an image sensor 995. The optical photographing lens assembly includes, in order from an object side to an image side, an aperture stop 900, a first lens element 910, a second lens element 920, a stop 901, a third lens element 930, a stop 902, a fourth lens element 940, a fifth lens element 950, a sixth lens element 960, a seventh lens element 970, an IR-cut filter 980 and an image surface 990. The image sensor 995 is disposed on the image surface 990 of the optical photographing lens assembly. The optical photographing lens assembly includes seven lens elements (910, 920, 930, 940, 950, 960 and 970) without additional one or more lens elements inserted between the first lens element 910 and the seventh lens element 970.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric. Moreover, the image-side surface 942 of the fourth lens element 940 includes at least one convex shape in an off-axis region thereof.

The fifth lens element 950 with positive refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric. Moreover, the object-side surface 961 of the sixth lens element 960 includes at least one concave shape in an off-axis region thereof, and the image-side surface 962 of the sixth lens element 960 includes at least one convex shape in an off-axis region thereof.

The seventh lens element 970 with negative refractive power has an object-side surface 971 being convex in a paraxial region thereof and an image-side surface 972 being concave in a paraxial region thereof. The seventh lens element 970 is made of a plastic material, and has the object-side surface 971 and the image-side surface 972 being both aspheric. Moreover, the image-side surface 972 of the seventh lens element 970 includes at least one convex shape in an off-axis region thereof.

The IR-cut filter 980 is made of a glass material and located between the seventh lens element 970 and the image surface 990, and will not affect the focal length of the optical photographing lens assembly.

The detailed optical data of the 9th embodiment are shown in TABLE 17 and the aspheric surface data are shown in TABLE 18 below.

TABLE 17

9th Embodiment
f = 3.92 mm, Fno = 1.54, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.385 | | | | |
| 2 | Lens 1 | 1.812 | ASP | 0.546 | Plastic | 1.545 | 56.1 | 7.13 |
| 3 | | 3.036 | ASP | 0.150 | | | | |
| 4 | Lens 2 | 2.390 | ASP | 0.230 | Plastic | 1.669 | 19.5 | −6.85 |
| 5 | | 1.510 | ASP | 0.263 | | | | |
| 6 | Stop | Plano | | −0.208 | | | | |
| 7 | Lens 3 | 1.734 | ASP | 0.464 | Plastic | 1.544 | 56.0 | 4.09 |
| 8 | | 7.109 | ASP | 0.064 | | | | |
| 9 | Stop | Plano | | 0.314 | | | | |
| 10 | Lens 4 | 576.280 | ASP | 0.407 | Plastic | 1.669 | 19.5 | −20.41 |
| 11 | | 13.331 | ASP | 0.094 | | | | |
| 12 | Lens 5 | −3.797 | ASP | 0.412 | Plastic | 1.544 | 56.0 | 5.26 |
| 13 | | −1.693 | ASP | 0.050 | | | | |
| 14 | Lens 6 | 3.782 | ASP | 0.340 | Plastic | 1.669 | 19.5 | −285.73 |
| 15 | | 3.575 | ASP | 0.433 | | | | |
| 16 | Lens 7 | 2.569 | ASP | 0.359 | Plastic | 1.584 | 28.2 | −4.59 |
| 17 | | 1.245 | ASP | 0.500 | | | | |
| 18 | IR-cut filter | Plano | | 0.210 | Glass | 1.517 | 64.2 | — |
| 19 | | Plano | | 0.345 | | | | |
| 20 | Image | Plano | | — | | | | |

Reference wavelength is 587.6 nm (d-line).
The effective radius of the surface 6 is 1.120 mm.
The effective radius of the surface 9 is 1.090 mm.

TABLE 18

Aspheric Coefficients

| Surface # | 2 | 3 | 4 | 5 | 7 | 8 | 10 |
|---|---|---|---|---|---|---|---|
| k= | −4.8766E−01 | −1.4605E+00 | −2.5012E+01 | −1.0563E+01 | −1.0627E+01 | 2.6463E+01 | −9.0000E+01 |
| A4= | 7.3112E−03 | −4.4891E−02 | 3.1023E−02 | 1.4142E−02 | 1.5199E−02 | −5.1602E−02 | −1.8878E−01 |
| A6= | −1.2155E−02 | −2.4018E−02 | −1.3658E−01 | 32867E−02 | 1.1343E−01 | 1.9405E−02 | 1.5956E−01 |
| A8= | 7.6767E−03 | −2.4375E−02 | 6.3185E−02 | −2.2250E−01 | −2.8524E−01 | −4.9910E−03 | −4.2448E−01 |
| A10= | −6.8255E−03 | 3.3428E−02 | 3.6199E−02 | 2.5403E−01 | 2.0270E−01 | −5.9478E−02 | 5.7874E−01 |
| A12= | −6.5492E−04 | −1.0506E−02 | −2.2090E−02 | −8.3559E−02 | −3.7625E−02 | 4.9594E−02 | −4.9848E−01 |
| A14= |  |  |  |  |  | −8.7719E−03 | 2.7028E−01 |
| A16= |  |  |  |  |  |  | −7.2551E−02 |

| Surface # | 11 | 12 | 13 | 14 | 15 | 16 | 17 |
|---|---|---|---|---|---|---|---|
| k= | −6.9759E+01 | 6.7379E+00 | −7.9797E−01 | 5.5520E−01 | 3.8632E−01 | −2.1072E+01 | −6.4031E+00 |
| A4= | −3.4127E−01 | −3.1322E−01 | 1.5857E−01 | 2.7726E−01 | 1.1627E−01 | −3.3922E−01 | −2.1583E−01 |
| A6= | 5.3924E−01 | 1.0606E+00 | −3.9960E−01 | −8.8239E−01 | −3.3596E−01 | 2.0313E−01 | 1.3195E−01 |
| A8= | −7.1672E−01 | −1.6249E+00 | 6.8893E−01 | 1.2941E+00 | 2.9482E−01 | −1.7123E−01 | −6.9202E−02 |
| A10= | 4.1086E−01 | 1.3854E+00 | −6.5064E−01 | −1.3257E+00 | −1.4653E−01 | 1.4570E−01 | 3.0196E−02 |
| A12= | 4.9200E−03 | −6.5082E−01 | 3.3742E−01 | 9.3532E−01 | 3.7495E−02 | −7.3608E−02 | −9.6955E−03 |
| A14= | −9.6188E−02 | 1.5006E−01 | −9.1406E−02 | −4.3996E−01 | −2.0651E−03 | 2.1621E−02 | 2.1191E−03 |
| A16= | 2.6568E−02 | −1.1815E−02 | 1.0280E−02 | 1.2684E−01 | −1.2151E−03 | −3.7086E−03 | −2.9679E−04 |
| A18= |  |  |  | −1.9445E−02 | 2.7608E−04 | 3.4713E−04 | 2.3999E−05 |
| A20= |  |  |  | 1.1629E−03 | −1.8207E−05 | −1.3761E−05 | −8.4998E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 3.92 | |f3/f1| | 0.57 |
| Fno | 1.54 | |f3/f2| | 0.60 |
| HFOV (deg.) | 38.9 | |f3/f4| | 0.20 |
| FOV (deg.) | 77.80 | |f3/f5| | 0.78 |
| Nmax | 1.669 | |f3/f6| | 0.01 |
| V20 | 3 | |f3/f7| | 0.89 |
| V30 | 4 | |f7/f1| | 0.64 |
| R8/|R7| | 0.02 | |f7/f2| | 0.67 |
| f/R13 | 1.53 | |f7/f4| | 0.23 |
| CT3/CT1 | 0.85 | |f7/f5| | 0.87 |
| T34/T45 | 4.02 | |f7/f6| | 0.02 |
| TD/EPD | 1.54 | f/f3 | 0.96 |
| TL/ImgH | 1.54 | Yc61/Yc62 | 0.91 |
| |f/R9| + |f/R10| | 3.35 | |Sag72|/CT7 | 1.37 |
| |f/R11| + |f/R12| | 2.13 | | |

In the optical photographing lens assembly according to the 9th embodiment, the optical photographing lens assembly includes two adjacent lens elements having Abbe numbers less than 30, i.e., the two adjacent lens elements are the sixth lens element 960 (Abbe number=19.5) and the seventh lens element 970 (Abbe number=28.2).

10th Embodiment

Figure 19:
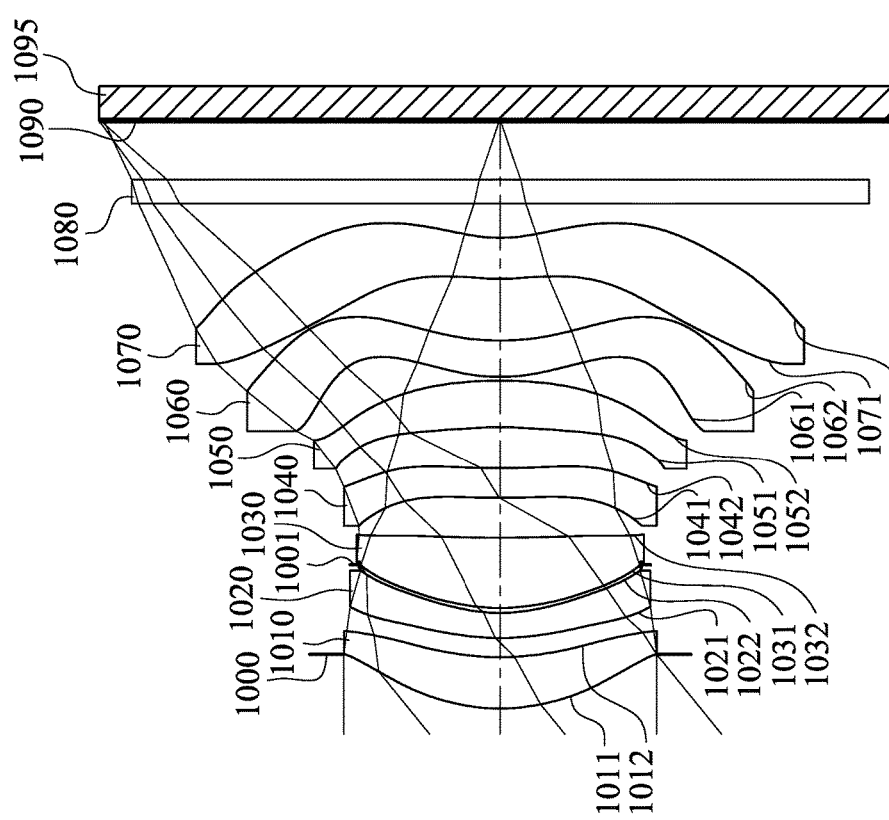
FIG. 19 is a schematic view of an imaging apparatus according to the 10th embodiment of the present disclosure.
Figure 20:
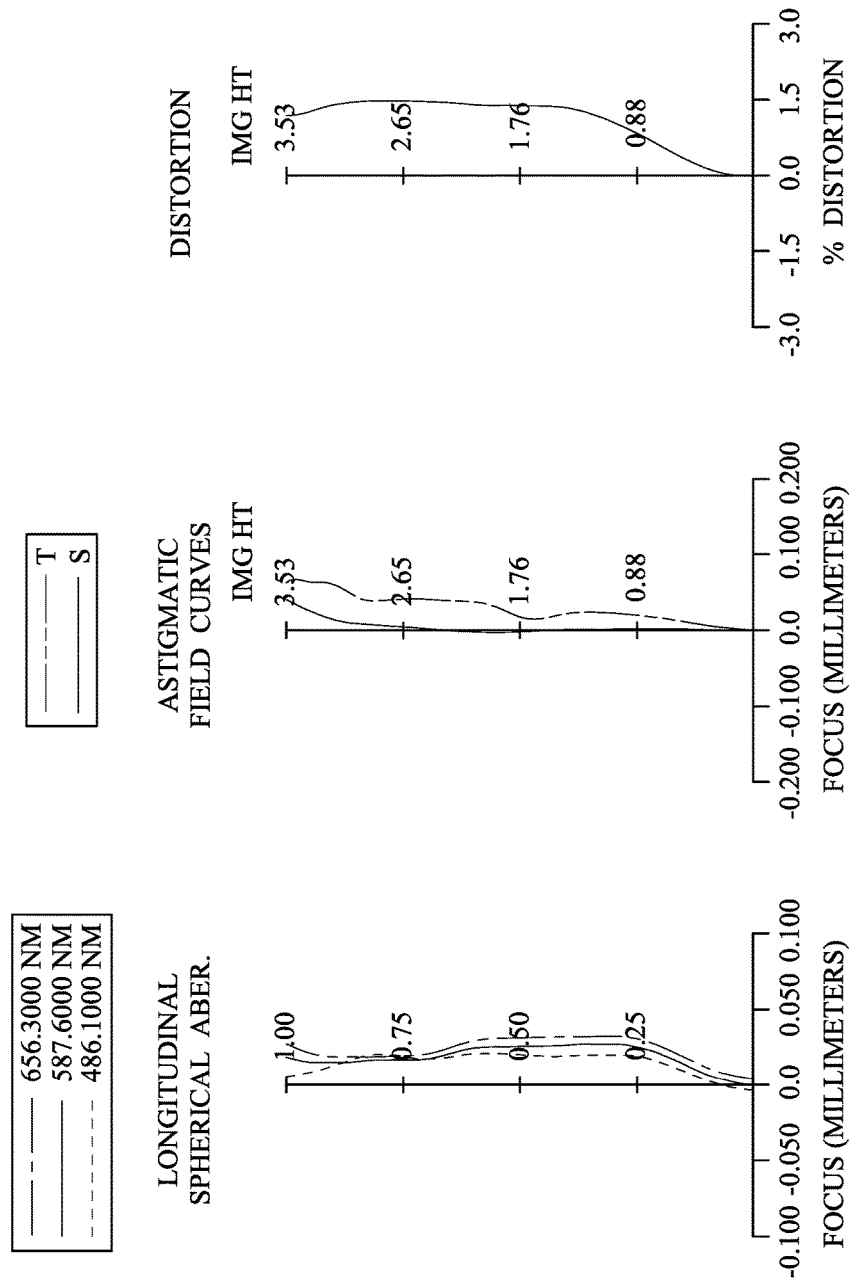
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an optical photographing lens assembly (its reference numeral is omitted) and an image sensor 1095. The optical photographing lens assembly includes, in order from an object side to an image side, an aperture stop 1000, a first lens element 1010, a second lens element 1020, a stop 1001, a third lens element 1030, a fourth lens element 1040, a fifth lens element 1050, a sixth lens element 1060, a seventh lens element 1070, an IR-cut filter 1080 and an image surface 1090. The image sensor 1095 is disposed on the image surface 1090 of the optical photographing lens assembly. The optical photographing lens assembly includes seven lens elements (1010, 1020, 1030, 1040, 1050, 1060 and 1070) without additional one or more lens elements inserted between the first lens element 1010 and the seventh lens element 1070.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric. Moreover, the image-side surface 1042 of the fourth lens element 1040 includes at least one convex shape in an off-axis region thereof.

The fifth lens element 1050 with negative refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric.

The sixth lens element 1060 with positive refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric. Moreover, the object-side surface 1061 of the sixth lens element 1060 includes at least one concave shape in an off-axis region thereof, and the image-side surface 1062 of the sixth lens element 1060 includes at least one convex shape in an off-axis region thereof.

The seventh lens element 1070 with negative refractive power has an object-side surface 1071 being convex in a paraxial region thereof and an image-side surface 1072 being concave in a paraxial region thereof. The seventh lens element 1070 is made of a plastic material, and has the object-side surface 1071 and the image-side surface 1072 being both aspheric. Moreover, the image-side surface 1072 of the seventh lens element 1070 includes at least one convex shape in an off-axis region thereof.

The IR-cut filter 1080 is made of a glass material and located between the seventh lens element 1070 and the image surface 1090, and will not affect the focal length of the optical photographing lens assembly.

The detailed optical data of the 10th embodiment are shown in TABLE 19 and the aspheric surface data are shown in TABLE 20 below.

TABLE 19

10th Embodiment
f = 4.29 mm, Fno = 1.56, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.475 | | | | |
| 2 | Lens 1 | 1.824 | ASP | 0.451 | Plastic | 1.545 | 56.1 | 9.48 |
| 3 | | 2.573 | ASP | 0.168 | | | | |
| 4 | Lens 2 | 2.293 | ASP | 0.220 | Plastic | 1.669 | 19.5 | −7.66 |
| 5 | | 1.523 | | 0.423 | | | | |
| 6 | Stop | Plano | | −0.379 | | | | |
| 7 | Lens 3 | 1.837 | ASP | 0.616 | Plastic | 1.544 | 56.0 | 3.95 |
| 8 | | 11.181 | ASP | 0.353 | | | | |
| 9 | Lens 4 | 8.386 | ASP | 0.260 | Plastic | 1.669 | 19.5 | −59.54 |
| 10 | | 6.841 | ASP | 0.362 | | | | |
| 11 | Lens 5 | −4.437 | ASP | 0.409 | Plastic | 1.566 | 37.4 | −72.83 |
| 12 | | −5.137 | ASP | 0.034 | | | | |
| 13 | Lens 6 | 1.597 | ASP | 0.320 | Plastic | 1.544 | 56.0 | 7.23 |
| 14 | | 2.501 | ASP | 0.543 | | | | |
| 15 | Lens 7 | 2.793 | ASP | 0.358 | Plastic | 1.534 | 55.9 | −4.95 |
| 16 | | 1.298 | | 0.300 | | | | |
| 17 | IR-cut filter | Plano | | 0.210 | Glass | 1.517 | 64.2 | — |
| 18 | | Plano | | 0.524 | | | | |
| 19 | Image | Plano | | — | | | | |

Reference wavelength is 587.6 nm (d-line).
The effective radius of the surface 6 is 1.240 mm.

TABLE 20

Aspheric Coefficients

| Surface # | 2 | 3 | 4 | 5 | 7 | 8 | 9 |
|---|---|---|---|---|---|---|---|
| k= | −1.4064E+00 | −2.8057E+00 | −3.9444E−01 | −2.7868E+00 | −6.5299E−01 | 6.4087E+01 | −9.3487E+00 |
| A4= | 2.1261E−02 | 1.3505E−02 | −1.0107E−01 | −1.3494E−01 | −1.2747E−01 | −3.2201E−02 | −1.2385E−01 |
| A6= | 1.5313E−02 | −2.8525E−02 | 1.1510E−02 | 3.6646E−01 | 2.9698E−01 | −1.8251E−02 | −2.0215E−02 |
| A8= | −4.6482E−02 | 5.1890E−02 | −1.7220E−01 | −6.5311E−01 | −4.8858E−01 | 7.4430E−02 | −5.6287E−02 |
| A10= | 6.1031E−02 | −1.1639E−01 | 1.0804E−01 | 6.0292E−01 | 4.0983E−01 | −1.3386E−01 | 1.1874E−01 |
| A12= | −4.8077E−02 | 9.3751E−02 | −1.3222E−02 | −2.7724E−01 | −1.5743E−01 | 1.2361E−01 | −1.1589E−01 |
| A14= | 1.7331E−02 | −3.0689E−02 | −5.5055E−03 | 6.7113E−02 | 2.0962E−02 | −6.0982E−02 | 7.1342E−02 |
| A16= | −2.2767E−03 | 3.4517E−03 | 7.1750E−04 | −8.7214E−03 | 1.1331E−03 | 1.3278E−02 | −1.8883E−02 |

| Surface # | 10 | 11 | 12 | 13 | 14 | 15 | 16 |
|---|---|---|---|---|---|---|---|
| k= | −7.8660E+01 | −6.6635E+01 | 5.0822E+00 | −4.4795E+00 | −1.8380E+00 | −3.0961E+01 | −7.7477E+00 |
| A4= | −3.7462E−02 | 1.8280E−02 | −1.5570E−01 | −3.2373E−02 | 1.1314E−01 | −3.0915E−01 | −1.7497E−01 |
| A6= | −1.1628E−01 | −3.5546E−02 | 1.4483E−01 | −3.2019E−02 | −2.5140E−01 | 2.0558E−01 | 1.0180E−01 |
| A8= | 1.6409E−01 | 5.8208E−02 | −4.7857E−02 | −6.2514E−02 | 1.9228E−01 | −1.0557E−01 | −4.7040E−02 |
| A10= | −2.1274E−01 | −9.2558E−02 | −2.2887E−02 | 1.3786E−01 | −9.4871E−02 | 4.2965E−02 | 1.5246E−02 |

TABLE 20-continued

| Aspheric Coefficients | | | | | | | |
|---|---|---|---|---|---|---|---|
| A12= | 1.7578E−01 | 4.7657E−02 | 1.7294E−02 | −1.4618E−01 | 3.1218E−02 | −1.1721E−02 | −3.4036E−03 |
| A14= | −7.0206E−02 | −6.0292E−03 | −2.6651E−03 | 9.1286E−02 | −6.6519E−03 | 1.9182E−03 | 5.3215E−04 |
| A16= | 1.0666E−02 | −9.3670E−04 | | −3.3760E−02 | 8.4662E−04 | −1.6892E−04 | −5.6529E−05 |
| A18= | | | | 6.7504E−03 | −5.4055E−05 | 6.1463E−06 | 3.5955E−06 |
| A20= | | | | −5.5433E−04 | 1.0560E−06 | | −1.0013E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from TABLE 19 and TABLE 20 as the following values and satisfy the following conditions:

| 10th Embodiment | | | |
|---|---|---|---|
| f (mm) | 4.29 | |f3/f1| | 0.42 |
| Fno | 1.56 | |f3/f2| | 0.52 |
| HFOV (deg.) | 39.0 | |f3/f4| | 0.07 |
| FOV (deg.) | 78.00 | |f3/f5| | 0.05 |
| Nmax | 1.669 | |f3/f6| | 0.55 |
| V20 | 2 | |f3/f7| | 0.80 |
| V30 | 2 | |f7/f1| | 0.52 |
| R8/|R7| | 0.82 | |f7/f2| | 0.65 |
| f/R13 | 1.54 | |f7/f4| | 0.08 |
| CT3/CT1 | 1.37 | |f7/f5| | 0.07 |
| T34/T45 | 0.98 | |f7/f6| | 0.69 |
| TD/EPD | 1.51 | f/f3 | 1.09 |
| TL/ImgH | 1.47 | Yc61/Yc62 | 0.83 |
| |f/R9| + |f/R10| | 1.80 | |Sag72|/CT7 | 2.23 |
| |f/R11| + |f/R12| | 4.40 | | |

11th Embodiment

Figure 21:
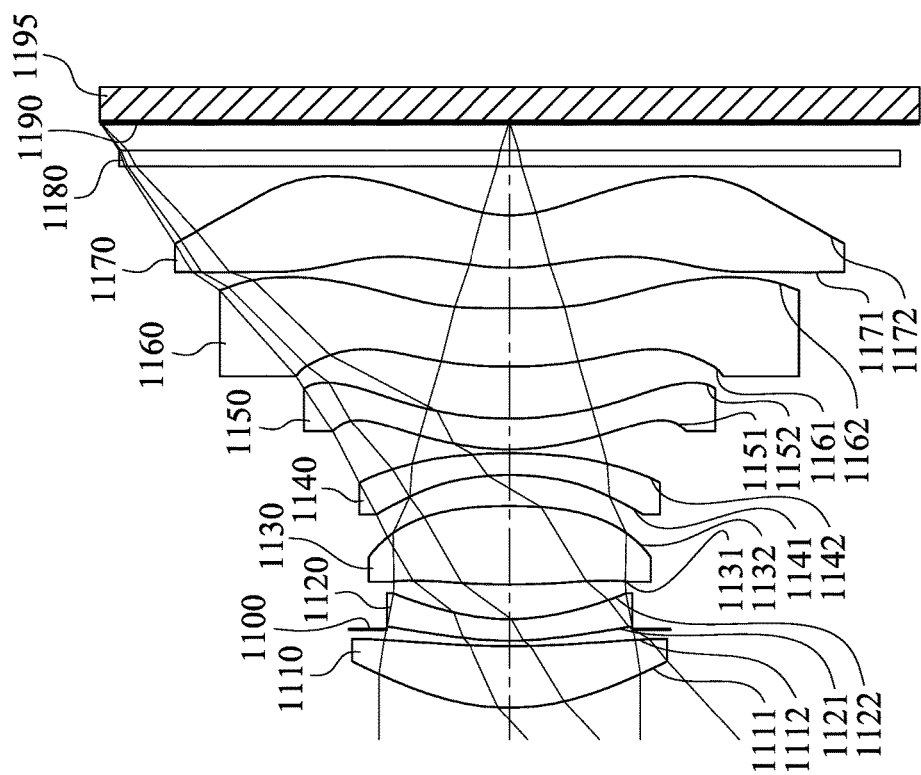
FIG. 21 is a schematic view of an imaging apparatus according to the 11th embodiment of the present disclosure.
Figure 22:
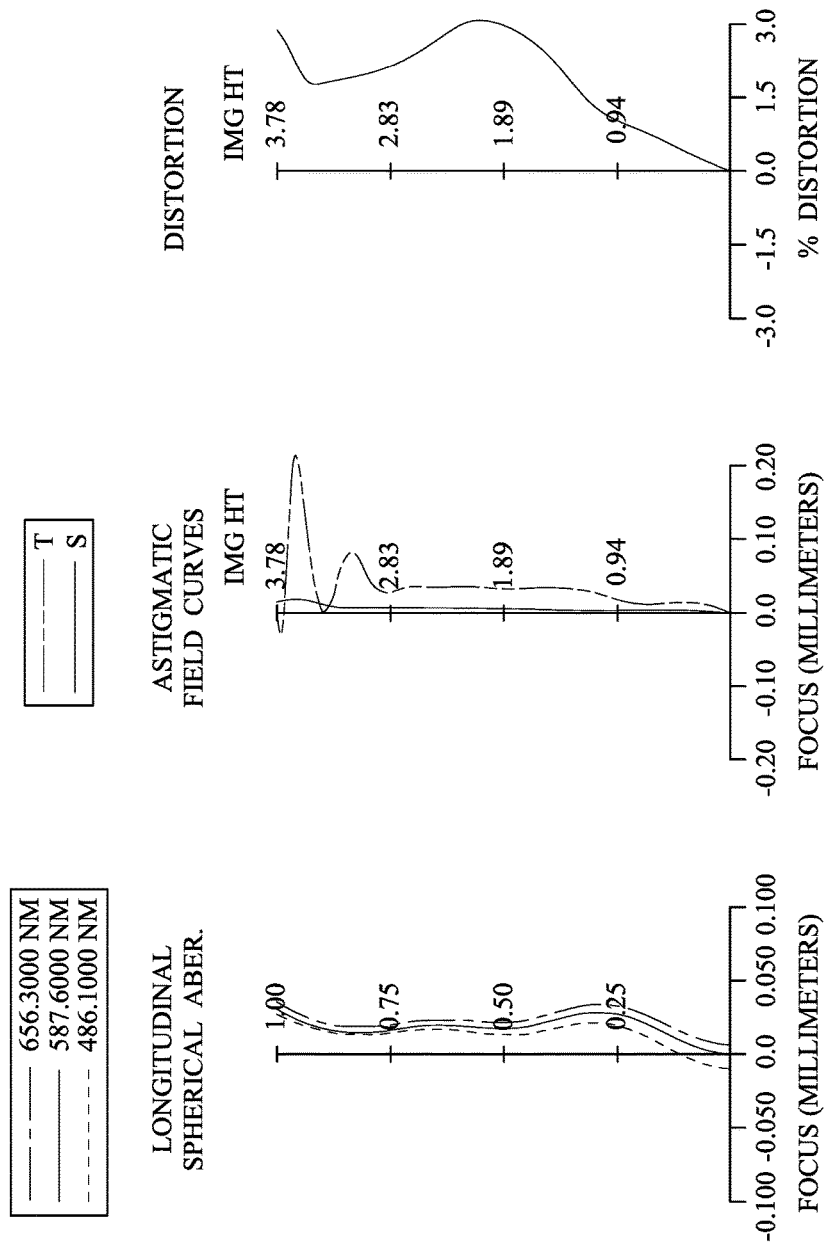
FIG. 22 shows spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an optical photographing lens assembly (its reference numeral is omitted) and an image sensor 1195. The optical photographing lens assembly includes, in order from an object side to an image side, a first lens element 1110, an aperture stop 1100, a second lens element 1120, a third lens element 1130, a fourth lens element 1140, a fifth lens element 1150, a sixth lens element 1160, a seventh lens element 1170, an IR-cut filter 1180 and an image surface 1190. The image sensor 1195 is disposed on the image surface 1190 of the optical photographing lens assembly. The optical photographing lens assembly includes seven lens elements (1110, 1120, 1130, 1140, 1150, 1160 and 1170) without additional one or more lens elements inserted between the first lens element 1110 and the seventh lens element 1170.

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with positive refractive power has an object-side surface 1131 being convex in a paraxial region thereof and an image-side surface 1132 being convex in a paraxial region thereof. The third lens element 1130 is made of a plastic material, and has the object-side surface 1131 and the image-side surface 1132 being both aspheric.

The fourth lens element 1140 with negative refractive power has an object-side surface 1141 being concave in a paraxial region thereof and an image-side surface 1142 being convex in a paraxial region thereof. The fourth lens element 1140 is made of a plastic material, and has the object-side surface 1141 and the image-side surface 1142 being both aspheric.

The fifth lens element 1150 with positive refractive power has an object-side surface 1151 being convex in a paraxial region thereof and an image-side surface 1152 being concave in a paraxial region thereof. The fifth lens element 1150 is made of a plastic material, and has the object-side surface 1151 and the image-side surface 1152 being both aspheric.

The sixth lens element 1160 with positive refractive power has an object-side surface 1161 being convex in a paraxial region thereof and an image-side surface 1162 being convex in a paraxial region thereof. The sixth lens element 1160 is made of a plastic material, and has the object-side surface 1161 and the image-side surface 1162 being both aspheric. Moreover, the object-side surface 1161 of the sixth lens element 1160 includes at least one concave shape in an off-axis region thereof.

The seventh lens element 1170 with negative refractive power has an object-side surface 1171 being convex in a paraxial region thereof and an image-side surface 1172 being concave in a paraxial region thereof. The seventh lens element 1170 is made of a plastic material, and has the object-side surface 1171 and the image-side surface 1172 being both aspheric. Moreover, the image-side surface 1172 of the seventh lens element 1170 includes at least one convex shape in an off-axis region thereof. Furthermore, the object-side surface 1171 of the seventh lens element 1170 includes at least two critical points.

The IR-cut filter 1180 is made of a glass material and located between the seventh lens element 1170 and the image surface 1190, and will not affect the focal length of the optical photographing lens assembly.

The detailed optical data of the 11th embodiment are shown in TABLE 21 and the aspheric surface data are shown in TABLE 22 below.

TABLE 21

11th Embodiment
f = 4.03 mm, Fno = 1.67, HFOV = 42.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.276 | ASP | 0.565 | Plastic | 1.545 | 56.1 | 5.76 |
| 2 | | 7.541 | ASP | 0.156 | | | | |
| 3 | Ape. Stop | Plano | | −0.106 | | | | |
| 4 | Lens 2 | 3.042 | ASP | 0.200 | Plastic | 1.660 | 20.4 | −9.75 |
| 5 | | 2.011 | ASP | 0.318 | | | | |
| 6 | Lens 3 | 6.257 | ASP | 0.725 | Plastic | 1.544 | 56.0 | 4.85 |
| 7 | | −4.374 | ASP | 0.285 | | | | |
| 8 | Lens 4 | −2.432 | ASP | 0.200 | Plastic | 1.566 | 37.4 | −9.83 |
| 9 | | −4.447 | ASP | 0.036 | | | | |
| 10 | Lens 5 | 2.465 | ASP | 0.289 | Plastic | 1.544 | 56.0 | 16.26 |
| 11 | | 3.277 | ASP | 0.481 | | | | |
| 12 | Lens 6 | 7.087 | ASP | 0.537 | Plastic | 1.544 | 56.0 | 12.06 |
| 13 | | −85.805 | ASP | 0.372 | | | | |
| 14 | Lens 7 | 2.254 | ASP | 0.483 | Plastic | 1.544 | 56.0 | −5.21 |
| 15 | | 1.161 | ASP | 0.450 | | | | |
| 16 | IR-cut filter | Plano | | 0.145 | Glass | 1.517 | 64.2 | — |
| 17 | | Plano | | 0.267 | | | | |
| 18 | Image | Plano | | — | | | | |

Reference wavelength is 587.6 nm (d-line).
The effective radius of the surface 7 is 1.300 mm.
The effective radius of the surface 10 is 1.630 mm.

TABLE 22

Aspheric Coefficients

| Surface # | 1 | 2 | 4 | 5 | 6 | 7 | 8 |
|---|---|---|---|---|---|---|---|
| k= | −1.0235E+00 | −5.6131E+01 | −1.9930E+01 | −4.5475E+00 | −9.0000E+01 | −1.2367E+01 | 2.7703E−01 |
| A4= | −3.5400E−03 | −7.4258E−03 | −9.9163E−03 | −2.0583E−02 | 1.5016E−02 | −7.9634E−02 | 7.8255E−02 |
| A6= | 5.4985E−02 | −2.9520E−02 | −8.4924E−02 | 5.7954E−04 | −2.8146E−02 | −9.8048E−02 | −3.4228E−01 |
| A8= | −1.7106E−01 | 2.1572E−01 | 4.9200E−01 | 1.2423E−01 | −8.6595E−02 | 2.8556E−01 | 3.9753E−01 |
| A10= | 2.8934E−01 | −5.7570E−01 | −1.3359E+00 | −2.6203E−01 | 2.9536E−01 | −6.2325E−01 | −1.8322E−01 |
| A12= | −3.0670E−01 | 8.2586E−01 | 2.1473E+00 | 2.1971E−01 | −5.0008E−01 | 9.2697E−01 | 6.8742E−02 |
| A14= | 2.0274E−01 | −7.1155E−01 | −2.1317E+00 | 3.3565E−03 | 4.6425E−01 | −8.6796E−01 | −9.1123E−02 |
| A16= | −8.1706E−02 | 3.6919E−01 | 1.2803E+00 | −1.3920E−01 | −2.2006E−01 | 4.8718E−01 | 7.9223E−02 |
| A18= | 1.8341E−02 | −1.0643E−01 | −4.2537E−01 | 9.1089E−02 | 3.4652E−02 | −1.5046E−01 | −3.0689E−02 |
| A20= | −1.7335E−03 | 1.3174E−02 | 5.9826E−02 | −1.8277E−02 | 4.6719E−03 | 1.9641E−02 | 4.4897E−03 |

| Surface # | 9 | 10 | 11 | 12 | 13 | 14 | 15 |
|---|---|---|---|---|---|---|---|
| k= | −4.8425E+01 | 1.2610E−01 | −5.9919E+00 | −1.9665E+00 | −2.0000E+01 | −4.0060E+00 | −1.3875E+00 |
| A4= | 3.2234E−02 | −2.7278E−02 | 2.9680E−02 | 1.8749E−01 | 2.4933E−01 | −1.3981E−01 | −2.6232E−01 |
| A6= | −2.6579E−01 | −5.8791E−02 | −6.4742E−02 | −2.7486E−01 | −2.2242E−01 | 7.0574E−02 | 1.7391E−01 |
| A8= | 3.5779E−01 | 1.8176E−01 | 1.3584E−01 | 2.3671E−01 | 1.1301E−01 | −3.7738E−02 | −8.6167E−02 |
| A10= | −2.6871E−01 | −2.6751E−01 | −1.4228E−01 | −1.6015E−01 | −3.8273E−02 | 1.5681E−02 | 2.9339E−02 |
| A12= | 1.6450E−01 | 2.3172E−01 | 8.1493E−02 | 8.0977E−02 | 8.7589E−03 | −4.0332E−03 | −6.6832E−03 |
| A14= | −9.9266E−02 | −1.2967E−01 | −2.7876E−02 | −2.8525E−02 | −1.3228E−03 | 6.2944E−04 | 9.8577E−04 |
| A16= | 4.6581E−02 | 4.5894E−02 | 5.7292E−03 | 6.4001E−03 | 1.2522E−04 | −5.8817E−05 | −8.9418E−05 |
| A18= | −1.2861E−02 | −9.3079E−03 | −6.5527E−04 | −8.0025E−04 | −6.7012E−06 | 3.0492E−06 | 4.5089E−06 |
| A20= | 1.5151E−03 | 8.1702E−04 | 3.1952E−05 | 4.1560E−05 | 1.5454E−07 | −6.7775E−08 | −9.6469E−08 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from TABLE 21 and TABLE 22 as the following values and satisfy the following conditions:

| 11th Embodiment | | | |
|---|---|---|---|
| f (mm) | 4.03 | |f3/f1| | 0.84 |
| Fno | 1.67 | |f3/f2| | 0.50 |

-continued

| 11th Embodiment | | | |
|---|---|---|---|
| HFOV (deg.) | 42.3 | |f3/f4| | 0.49 |
| FOV (deg.) | 84.60 | |f3/f5| | 0.30 |
| Nmax | 1.660 | |f3/f6| | 0.40 |
| V20 | 0 | |f3/f7| | 0.93 |
| V30 | 1 | |f7/f1| | 0.90 |
| R8/|R7| | −1.83 | |f7/f2| | 0.53 |
| f/R13 | 1.79 | |f7/f4| | 0.53 |
| CT3/CT1 | 1.28 | |f7/f5| | 0.32 |
| T34/T45 | 7.92 | |f7/f6| | 0.43 |
| TD/EPD | 1.88 | f/f3 | 0.83 |
| TL/ImgH | 1.43 | Yc61/Yc62 | 0.65 |

-continued

11th Embodiment

| |f/R9| + |f/R10| | 2.86 | |Sag72|/CT7 | 0.54 |
|---|---|---|---|
| |f/R11| + |f/R12| | 0.62 | | |

12th Embodiment

Figure 25:
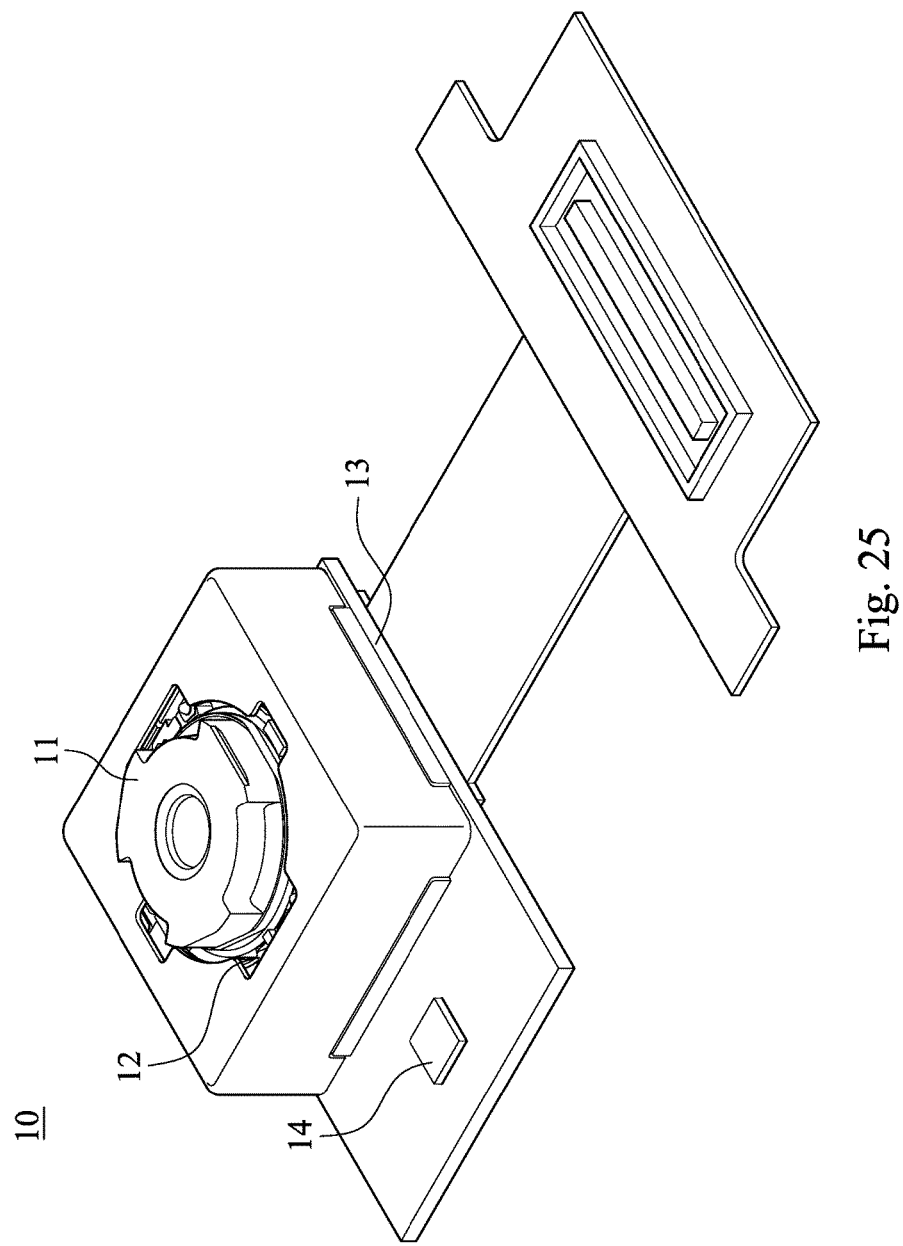
FIG. 25 is a three-dimensional view of an imaging apparatus according to the 12th embodiment of the present disclosure.

FIG. 25 is a three-dimensional view of an imaging apparatus 10 according to the 12th embodiment of the present disclosure. In FIG. 25, the imaging apparatus 10 according to the 12th embodiment is a camera module. The imaging apparatus 10 includes an imaging lens module 11, a driving assembly 12 and an image sensor 13, wherein the imaging lens module 11 includes the optical photographing lens assembly according to the 1st embodiment and a barrel (its reference numeral is omitted) for carrying the optical photographing lens assembly. An image of an imaged object can be captured by the imaging apparatus 10 via the imaging lens module 11, the driving assembly 12 is used to bring the image into focus so that the image can be clearly formed on the image sensor 13, and then the image data is generated.

The driving assembly 12 can have auto-focus functionality, and a driving method thereof can use a voice coil motor (VCM), a micro electro-mechanical system (MEMS), a piezoelectric system or a shape memory alloy system. The driving assembly 12 enables the optical photographing lens assembly to obtain a preferable imaging position, so that clear images of the imaged object at different object distances can be obtained.

The image sensor 13 of the imaging apparatus 10 can have the properties of high photosensitivity and low noise (such as CMOS and CCD) and is disposed on the image surface of the optical photographing lens assembly, so that the high image quality of the optical photographing lens assembly can be obtained.

Moreover, the imaging apparatus 10 can further include an image stabilizing module 14. The image stabilizing module 14 can exemplarily include an accelerator, a gyro sensor or a Hall Effect sensor. In the 12th embodiment, the image stabilizing module 14 is a gyro sensor. However, it is only exemplary and the image stabilizing module 14 is not limited thereto. By adjusting the movements in different axial directions of the optical photographing lens assembly, the image blur due to motion during exposure can be compensated, so that the image quality of dynamic or low-light scenes can be enhanced. Moreover, advanced image compensation functions, such as optical image stabilization (OIS) or electronic image stabilization (EIS), can be provided.

13th Embodiment

Figure 26A:
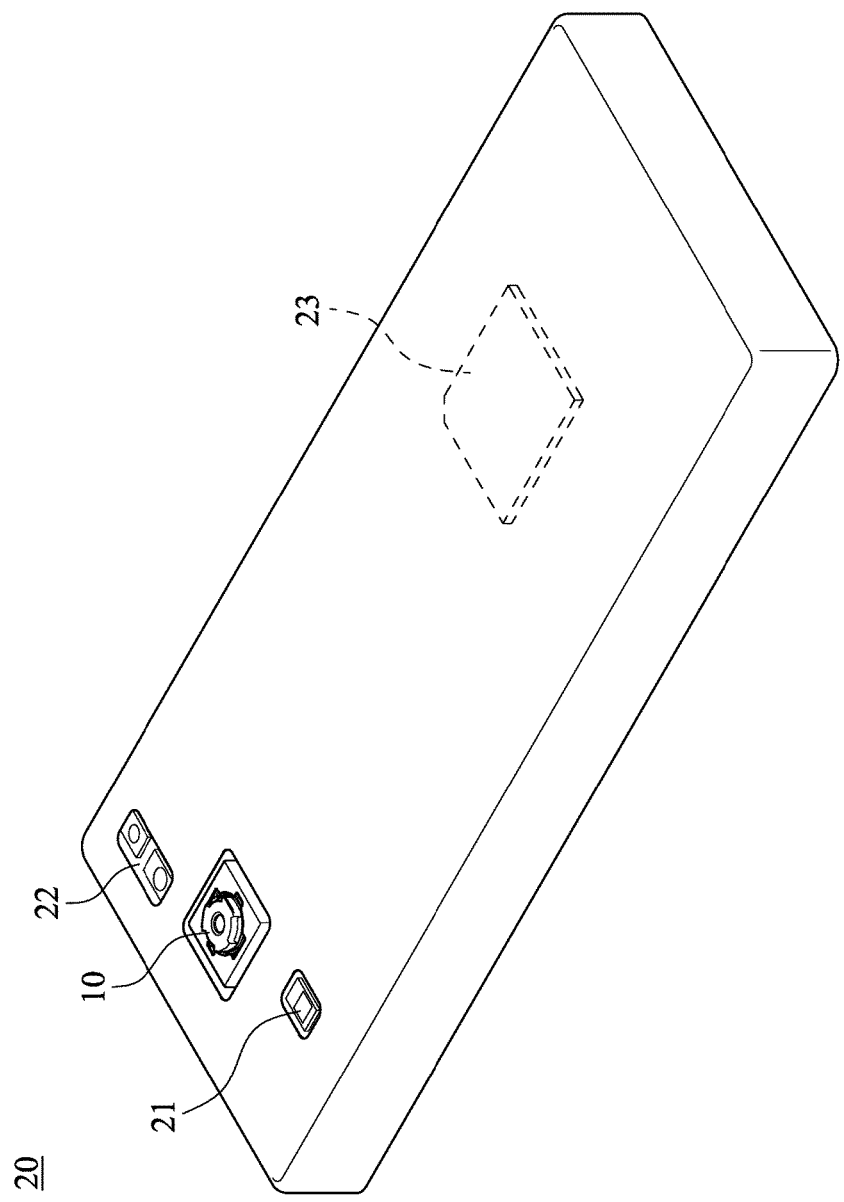
FIG. 26A is a schematic view showing a side of an electronic device according to the 13th embodiment of the present disclosure.
Figure 26B:
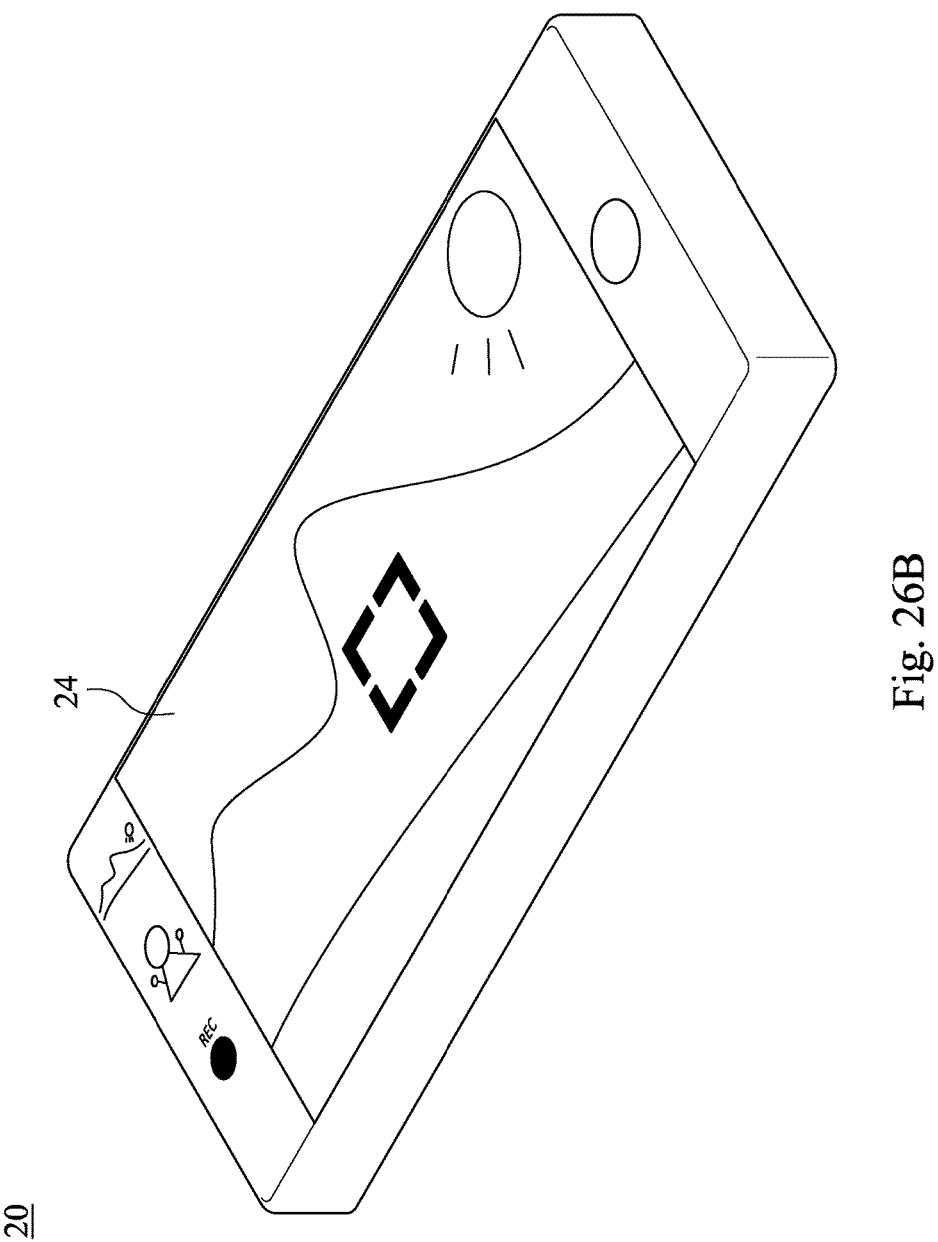
FIG. 26B is a schematic view showing another side of the electronic device in FIG. 26A.
Figure 26C:
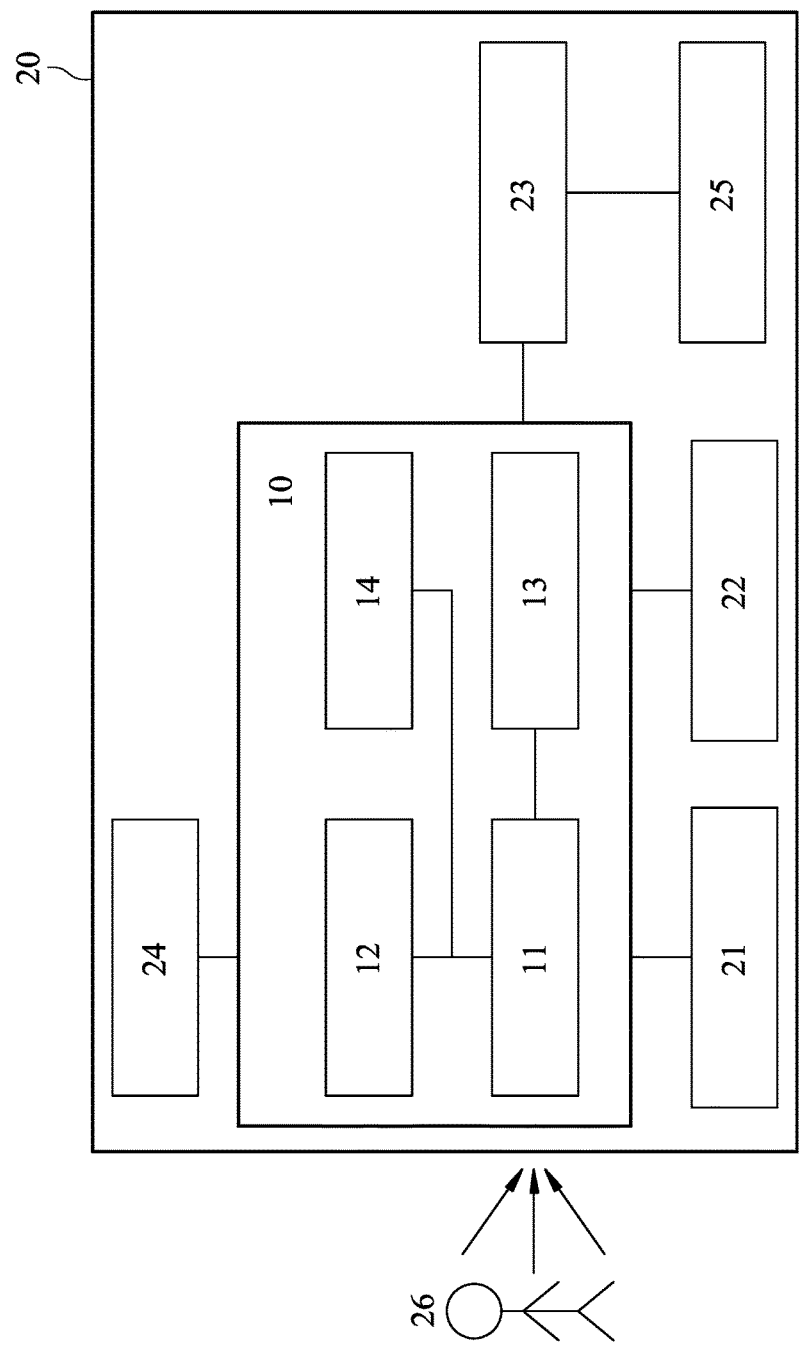
FIG. 26C is a block diagram of the electronic device in FIG. 26A.

FIG. 26A is a schematic view showing a side of an electronic device 20 according to the 13th embodiment of the present disclosure. FIG. 26B is a schematic view showing another side of the electronic device 20 in FIG. 26A. FIG. 26C is a block diagram of the electronic device 20 in FIG. 26A. In FIG. 26A, FIG. 26B and FIG. 26C, the electronic device 20 of the 13th embodiment is a smartphone. The electronic device 20 includes the imaging apparatus 10, a flash module 21, a focusing assist module 22, an image signal processor (ISP) 23, a user interface 24 and an image software processor 25. When a user takes a photograph via the user interface 24, light rays of the imaged object 26 are focused by the electronic device 20 via the imaging apparatus 10 for generating an image. Meanwhile, light compensation is provided by the flash module 21, the object distance of the imaged objected 26 is obtained by the focusing assist module 22 for quick focusing, and an optimized image processing is provided by the image signal processor 23 and the image software processor 25, so that the image quality of the optical photographing lens assembly can be further enhanced. The focusing assist module 22 can adopt conventional infrared or laser for quick focusing. The user interface 24 can adopt a touch screen or a physical button, and an image software processor 25 can be utilized through the user interface 24 for providing a variety of photographing modes and image editing functions.

The imaging apparatus 10 of the 13th embodiment can be the same as the imaging apparatus 10 of the 12th embodiment, and are not repeated herein.

14th Embodiment

Figure 27:
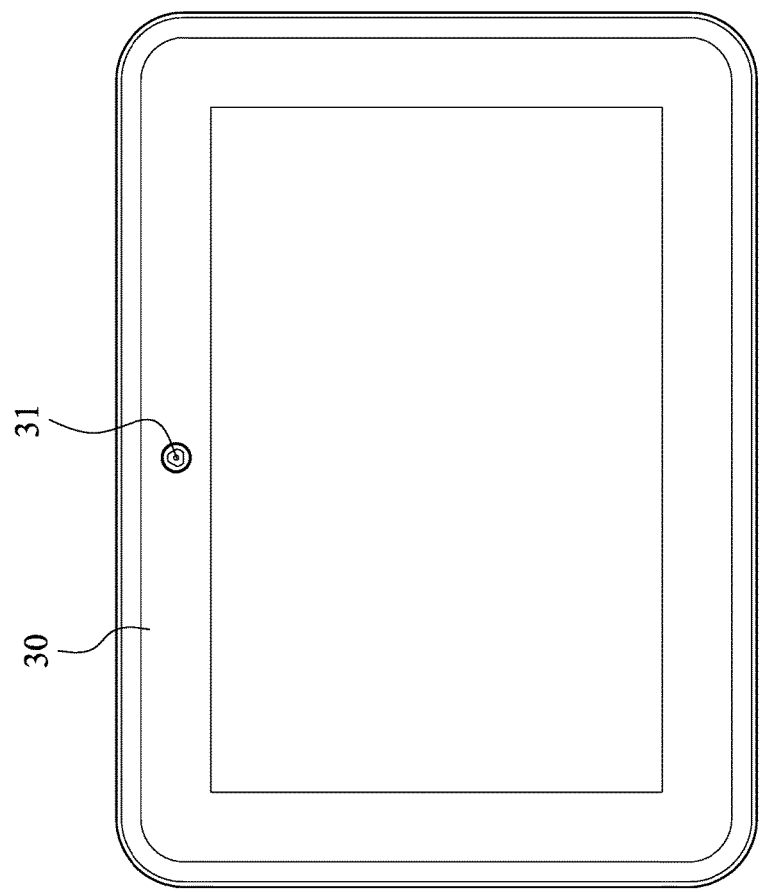
FIG. 27 is a schematic view of an electronic device according to the 14th embodiment of the present disclosure.

FIG. 27 is a schematic view of an electronic device 30 according to the 14th embodiment of the present disclosure. The electronic device 30 of the 14th embodiment is a tablet personal computer. The electronic device 30 includes an imaging apparatus 31. The imaging apparatus 31 can be the same as that of the 12th embodiment, and will not be repeated herein.

15th Embodiment

Figure 28:
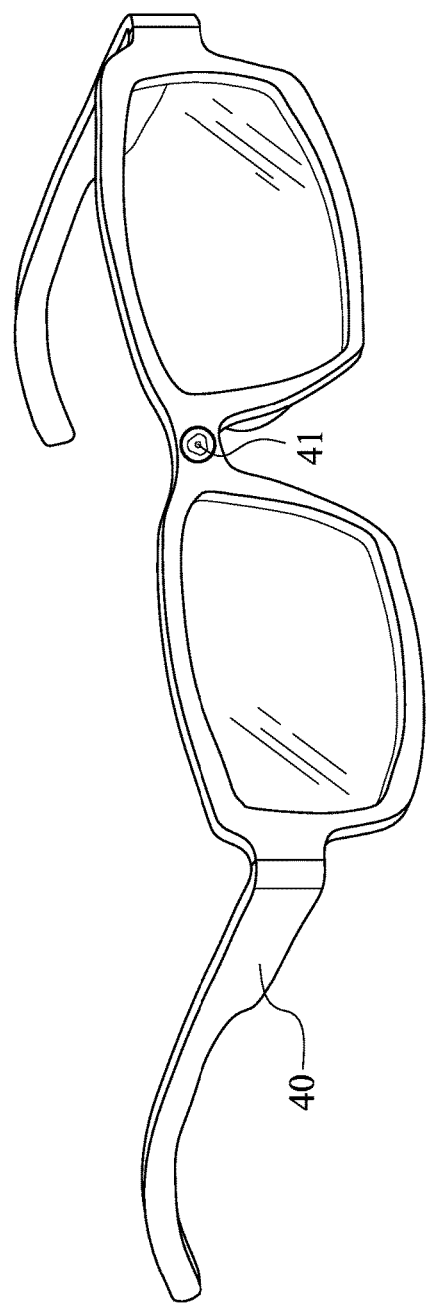
FIG. 28 is a schematic view of an electronic device according to the 15th embodiment of the present disclosure.

FIG. 28 is a schematic view of an electronic device 40 according to the 15th embodiment of the present disclosure. The electronic device 40 of the 15th embodiment is a wearable device. The electronic device 40 includes an imaging apparatus 41. The imaging apparatus 41 can be the same as that of the 12th embodiment, and will not be repeated herein.

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising seven lens elements, the seven lens elements being, in order from an object side to an image side:
   a first lens element, a second lens element, a third lens element, a fourth lens element, a fifth lens element, a sixth lens element and a seventh lens element;
   wherein the first lens element with positive refractive power has an object-side surface being convex in a paraxial region thereof; the third lens element has positive refractive power; the seventh lens element has an image-side surface being concave in a paraxial region thereof and comprising at least one convex shape in an off-axis region thereof, and an object-side surface and the image-side surface of the seventh lens element are aspheric;

wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the optical photographing lens assembly is f, a curvature radius of the object-side surface of the seventh lens element is R13, an axial distance between the third lens element and the fourth lens element is T34, an axial distance between the fourth lens element and the fifth lens element is T45, and the following conditions are satisfied:

$|f3/f1| \leq 0.84$;

$|f3/f2| \leq 1.0$;

$|f3/f4| \leq 1.0$;

$|f3/f5| \leq 1.0$;

$|f3/f6| \leq 1.0$;

$|f3/f7| \leq 1.0$;

$0.20 \leq f/R13$; and $T34/T45 \leq 8.0$.

2. The optical photographing lens assembly of claim 1, wherein the sixth lens element has an object-side surface being convex in a paraxial region thereof and comprising at least one concave shape in an off-axis region thereof, and the sixth lens element has an image-side surface being concave in a paraxial region thereof and comprising at least one convex shape in an off-axis region thereof.

3. The optical photographing lens assembly of claim 1, wherein a maximum of refractive indexes of all the lens elements of the optical photographing lens assembly is Nmax, and the following condition is satisfied:

$1.650 \leq Nmax < 1.75$.

4. The optical photographing lens assembly of claim 1, wherein the optical photographing lens assembly comprises two adjacent lens elements having Abbe numbers less than 30.

5. The optical photographing lens assembly of claim 1, wherein the focal length of the optical photographing lens assembly is f, the curvature radius of the object-side surface of the seventh lens element is R13, and the following condition is satisfied:

$0.70 < f/R13 < 5.0$.

6. The optical photographing lens assembly of claim 1, wherein the first lens element has an image-side surface being concave in a paraxial region thereof.

7. The optical photographing lens assembly of claim 1, wherein the focal length of the optical photographing lens assembly is f, the focal length of the third lens element is f3, and the following condition is satisfied:

$f/f3 < 1.0$.

8. The optical photographing lens assembly of claim 1, wherein the focal length of the first lens element is f1, the focal length of the second lens element is f2, the focal length of the fourth lens element is f4, the focal length of the fifth lens element is f5, the focal length of the sixth lens element is f6, the focal length of the seventh lens element is f7, and the following conditions are satisfied:

$|f7/f1| \leq 1.0$;

$|f7/f2| \leq 1.0$;

$|f7/f4| \leq 1.0$;

$|f7/f5| \leq 1.0$; and $|f7/f6| \leq 1.0$.

9. The optical photographing lens assembly of claim 1, wherein an axial distance between the object-side surface of the first lens element and an image surface is TL, a maximum image height of the optical photographing lens assembly is ImgH, an f-number of the optical photographing lens assembly is Fno, a maximum field of view of the optical photographing lens assembly is FOV, and the following conditions are satisfied:

$0.80 < TL/ImgH < 1.60$;

$1.0 < Fno < 2.0$; and $70 \text{ degrees} < FOV < 100 \text{ degrees}$.

10. The optical photographing lens assembly of claim 1, wherein the axial distance between the third lens element and the fourth lens element is T34, the axial distance between the fourth lens element and the fifth lens element is T45, and the following condition is satisfied:

$0.50 < T34/T45 < 6.0$.

11. The optical photographing lens assembly of claim 1, wherein a displacement in parallel with an optical axis from an axial vertex on the image-side surface of the seventh lens element to a maximum effective radius position on the image-side surface of the seventh lens element is Sag72, a central thickness of the seventh lens element is CT7, and the following condition is satisfied:

$1.0 < |Sag72|/CT7$.

12. The optical photographing lens assembly of claim 1, wherein the object-side surface of the seventh lens element comprises at least two critical points.

13. The optical photographing lens assembly of claim 1, wherein the fourth lens element has an image-side surface being concave in a paraxial region thereof and comprising at least one convex shape in an off-axis region thereof.

14. The optical photographing lens assembly of claim 1, wherein the focal length of the first lens element is f1, the focal length of the third lens element is f3, the focal length of the sixth lens element is f6, and the following conditions are satisfied:

$|f3/f1| < 0.75$; and $|f3/f6| < 0.60$.

15. The optical photographing lens assembly of claim 1, wherein a total number of lens elements having Abbe numbers less than 30 is V30, and the following condition is satisfied:

$3 \leq V30$.

16. The optical photographing lens assembly of claim 1, wherein the sixth lens element has positive refractive power.

17. The optical photographing lens assembly of claim 1, wherein a vertical distance between a non-axial critical point on an object-side surface of the sixth lens element and an optical axis is Yc61, a vertical distance between a non-axial critical point on an image-side surface of the sixth lens element and the optical axis is Yc62, and the following condition is satisfied:

$0.3 < Yc61/Yc62 < 1.5.$

18. The optical photographing lens assembly of claim 1, wherein the fourth lens element has negative refractive power.

19. The optical photographing lens assembly of claim 1, wherein a total number of lens elements having Abbe numbers less than 20 is V20, and the following condition is satisfied:

$1 \leq V20.$

20. The optical photographing lens assembly of claim 1, wherein a curvature radius of an object-side surface of the fourth lens element is R7, a curvature radius of an image-side surface of the fourth lens element is R8, and the following condition is satisfied:

$0 \leq R8/|R7| < 1.0.$

21. The optical photographing lens assembly of claim 1, wherein a central thickness of the first lens element is CT1, a central thickness of the third lens element is CT3, and the following condition is satisfied:

$1.0 < CT3/CT1 < 3.0.$

22. The optical photographing lens assembly of claim 1, wherein the focal length of the optical photographing lens assembly is f, a curvature radius of an object-side surface of the fifth lens element is R9, a curvature radius of an image-side surface of the fifth lens element is R10, and the following condition is satisfied:

$|f/R9| + |f/R10| < 3.50.$

23. The optical photographing lens assembly of claim 1, wherein the focal length of the optical photographing lens assembly is f, a curvature radius of an object-side surface of the sixth lens element is R11, a curvature radius of an image-side surface of the sixth lens element is R12, and the following condition is satisfied:

$|f/R11| + |f/R12| < 2.70.$

24. The optical photographing lens assembly of claim 1, wherein an axial distance between the object-side surface of the first lens element and the image-side surface of the seventh lens element is TD, an entrance pupil diameter of the optical photographing lens assembly is EPD, and the following condition is satisfied:

$0.8 < TD/EPD < 2.0.$

25. An imaging apparatus, comprising:
the optical photographing lens assembly of claim 1; and
an image sensor, wherein the image sensor is disposed on an image surface of the optical photographing lens assembly.

26. An electronic device, comprising:
the imaging apparatus of claim 25.

* * * * *